United States Patent
Wesson

(10) Patent No.: US 10,546,143 B1
(45) Date of Patent: Jan. 28, 2020

(54) SYSTEM AND METHOD FOR CLUSTERING FILES AND ASSIGNING A MALICIOUSNESS PROPERTY BASED ON CLUSTERING

(71) Applicant: Support Intelligence, Inc., San Francisco, CA (US)

(72) Inventor: Rick Holloman Wesson, Richmond, CA (US)

(73) Assignee: Support Intelligence, Inc., San Francisco, CA (US)

(*) Notice: Subject to any disclaimer, the term of this patent is extended or adjusted under 35 U.S.C. 154(b) by 139 days.

(21) Appl. No.: 15/812,915

(22) Filed: Nov. 14, 2017

Related U.S. Application Data

(60) Provisional application No. 62/543,834, filed on Aug. 10, 2017.

(51) Int. Cl.
| | |
|---|---|
| G06F 21/55 | (2013.01) |
| G06F 21/62 | (2013.01) |
| G06F 21/56 | (2013.01) |
| G06F 17/14 | (2006.01) |
| G06F 16/17 | (2019.01) |
| G06F 16/13 | (2019.01) |
| G06F 21/51 | (2013.01) |

(52) U.S. Cl.
CPC ........ G06F 21/6209 (2013.01); G06F 16/137 (2019.01); G06F 16/17 (2019.01); G06F 17/14 (2013.01); G06F 21/56 (2013.01)

(58) Field of Classification Search
None
See application file for complete search history.

(56) References Cited

U.S. PATENT DOCUMENTS

| | | |
|---|---|---|
| 5,692,013 A | 11/1997 | Koslov |
| 6,215,408 B1 | 4/2001 | Léonard |
| 6,259,314 B1 | 7/2001 | Liu |
| 8,270,559 B2 | 9/2012 | Chiang |
| 8,351,643 B2 | 1/2013 | Radhakrishnan |
| 8,773,422 B1 | 7/2014 | Garland |
| 9,565,209 B1 * | 2/2017 | Grzonkowski ....... G06F 16/152 |
| 9,843,596 B1 * | 12/2017 | Averbuch ............ H04L 63/1416 |
| 10,122,742 B1 * | 11/2018 | Oprea ................. H04L 63/1425 |

(Continued)

OTHER PUBLICATIONS

A Taxonomy Framework for Unsupervised Outlier Detection Techniques for Multi-Type Data Sets. Zhang et al. (Year: 2007).*

(Continued)

*Primary Examiner* — Venkat Perungavoor
(74) *Attorney, Agent, or Firm* — Van Pelt, Yi & James LLP

(57) ABSTRACT

A file is received. File contents are transformed using a space-filling curve. The results are down-sampled to generate a sample locus. A cluster identifier is assigned to the file. In response to a determination that the cluster identifier is not present in a data store, a set of candidate nearest neighbors is determined for the cluster identifier. For each candidate nearest neighbor, a set of existing cluster identifiers present in the data store is determined. For each existing cluster identifier, a set of member loci is determined. An edit distance between the sample locus and each of the member loci is determined. Finally, in response to a determination that a first locus in the set of member loci is within a threshold edit distance of the sample locus, one or more properties associated with the first locus is assigned to the file.

28 Claims, 23 Drawing Sheets

(56) References Cited

U.S. PATENT DOCUMENTS

| | | |
|---|---|---|
| 2002/0140615 A1 | 10/2002 | Carles |
| 2003/0110163 A1 | 6/2003 | Chen |
| 2003/0194116 A1 | 10/2003 | Wong |
| 2008/0158396 A1 | 7/2008 | Fainstain |
| 2009/0067736 A1 | 3/2009 | Payton |
| 2009/0179999 A1 | 7/2009 | Albu |
| 2010/0021001 A1 | 1/2010 | Honsinger |
| 2010/0283779 A1 | 11/2010 | Chiang |
| 2011/0026761 A1 | 2/2011 | Radhakrishnan |
| 2018/0096144 A1* | 4/2018 | Pan ................. G06F 21/566 |

OTHER PUBLICATIONS

Protecting Location Privacy for Outsourced Spatial Data in Cloud Storage. Tian et al. Hindawi Publishing. (Year: 2014).*

Alexis Joly, "Statistical Similarity Search Applied to Content-Based Video Copy Detection", 2005, pp. 1-10.

Andrew Wilson, "Spatially Encoded Image-Space Simplifications for Interactive Walkthrough", 2002, pp. 314-323.

Author Unknown, "Security Briefing" Companion to HPSR Security Briefing Podcast Episode 14, HP Security Research, Jun. 2014.

B. Irwin, "High Level Internet Scale Traffic Visualization Using Hilbert Curve Mapping", 2008, pp. 147-158.

Gavrilut et al., "Malware detection using perceptrons and support vector machines." Future Computing, Service Computation, Cognitive, Adaptive, Content, Patterns, Computation World (2009): 283-288.

Karthik Raman, "Selecting features to classify malware", InfoSec Southwest, 2012.

Nataraj et al, "Malware Images: Visualization and Automatic Classification", ACM, Jul. 20, 2011.

Nataraj et al., "A Comparative Assessment of Malware Classification using Binary Texture Analysis adn Dynamic Analysis", ACM, 2011.

Bongki Moon, Hosagrahar V. Jagadish, Christos Faloutsos, and Joel H. Saltz. "Analysis of the clustering properties of the hilbert space-filling curve." IEEE Transactions on knowledge and data engineering 13, No. 1 (2001): 124-141.

Joshua Saxe and Konstantin Berlin. "Deep neural network based malware detection using two dimensional binary program features." In 2015 10th International Conference on Malicious and Unwanted Software (Malware), pp. 11-20. IEEE, 2015.

* cited by examiner

```
ctx = cl.create_some_context()
queue = cl.CommandQueue(ctx)

mf = cl.mem_flags
data_buf = cl.Buffer(ctx, mf.READ_ONLY | mf.COPY_HOST_PTR, hostbuf=pxe_data)
img_buf = cl.Buffer(ctx, mf.WRITE_ONLY, pxe_data.nbytes)

prg = cl.Program(ctx, """
    __kernel void hbert(const int h_order,
                       const int side,
        __global const unsigned char *data,
        __global unsigned char *image)
    {
            int gid = get_global_id(0);

int i;
            long state, x, y, row;

state = 0;                  /* Initialize. */
            x = y = 0;

for (i = 2 * h_order - 2; i >= 0; i -= 2) {     /* Do n times. */
                row = 4 * state | ((gid >> i) & 3);         /* Row in table. */
                x = (x << 1) | ((0x936C >> row) & 1);
                y = (y << 1) | ((0x39C6 >> row) & 1);
                state = (0x3E6B94C1 >> 2 * row) & 3;        /* New state. */
            } image[x+(side*y)] =  data[gid] ;
      }
   """).build()
print "hOrder=", hOrder
print "side=", side
print "data.shape=", pxe_data.shape prg.hbert(queue, pxe_data.shape, None, np.int32(hOrder), np.int32(side), data_buf, img_buf)

img_result = np.empty_like(pxe_data);
cl.enqueue_copy(queue, img_result, img_buf)
```

FIG. 6

```
public static class HilbertKernel extends Kernel {
    private int order = 0;

@Constant
    byte[] h_data;
    private byte[] h_image;
    private int side=0;

public void setOrder(int value){
        this.order = value ;

} public HilbertKernel(int order, byte[] data, byte[] result) {
        this.order = order;
        this.h_data = data   ;
        this.side = (int) pow(2, order) ;
        this.h_image = result;
    }

@Override
    public void run() {
        int gid = getGlobalId();

int i;
        long state, x, y, row;

state = 0L;                    /* Initialize. */
        x = 0L;
        y = 0L;

for (i = 2 * order - 2; i >= 0; i -= 2) {       /* Do n times. */
            row = 4 * state | ((gid >> i) & 3  );        /* Row in table. */
            x = (x << 1) | ((0x936C >> row) & 1);
            y = (y << 1) | ((0x39C6 >> row) & 1);
            state = (0x3E6B94C1 >> 2 * row) & 3;    /* New state. */
        } h_image[(int)(x+(side*y))] = h_data[gid]   ;

Daily Cluster Report 20170426  ←—1100

| 1102 | 1104 | 1106 | 1108 | |
|---|---|---|---|---|
| o3f9.1a9f2049c0000b16 | 0.55725956 | 377 | kovter pemalform riskware | } 1110 |
| k3e9.45e52930a92444f2 | 0.16719538 | 312 | virut virtob virux | |
| n3e9.16b2e44980000954 | 0.0717898 | 202 | allaple virut rahack | |
| o3ed.11999cc1c4000b12 | 0.37708145 | 162 | miuref symmi advml | |
| o3e9.299c6a49c0000b12 | 0.5409055 | 157 | downloadassistant downloadasist downloada: | |
| p3e9.55156a48c0000330 | 0.6676471 | 155 | icloader kryptik advml | |
| p3e9.5515ea48c0000b32 | 0.65047437 | 152 | strictor cobra advml | |
| o3f9.1a9d2049c0000b16 | 0.49040794 | 152 | kovter pemalform riskware | |
| p3e7.55156a48c0000b32 | 0.6251104 | 146 | jaiko icloader kryptik | |
| p3e9.75193841cc000b32 | 0.708207 | 143 | advml grayware icloader | |
| p3e9.55556a88c0000b32 | 0.60104203 | 142 | cobra kryptik advml | |
| n3f0.224b6854345946f6 | 0.11565673 | 136 | mira uymi icgh | |
| 1112 k3e9.211493c9cc000b12 | 0.1880222 | 126 | virut virtob virux | |
| i3e7.48396808c0000b20 | 0.86460805 | 122 | androidos risktool smspay | |
| o3e7.11935895c2210b12 | 0 | 120 | | |
| i3e7.4839a808c0000b20 | 0.8680347 | 112 | androidos dropperagent karw | |
| p3e9.55156848c0000330 | 0.5858563 | 106 | jaik adload icloader | |
| o3e9.194bb949c4000b12 | 0.3471123 | 105 | browsefox yontoo advml | |
| i3e7.516f96c9cc000932 | 0.9818182 | 104 | | |
| o3e9.49b0ea48c0000b12 | 0.47940892 | 103 | downloadassistant bundler downloadasist | |
| 1114 k3e9.211c93c9cc000b12 | 0.18894428 | 100 | virut virtob virux | |
| p3e9.4a569cc1c8000b12 | 0 | 97 | | |
| o3e9.3b5b3841c8000b12 | 0.46460426 | 93 | graftor instally advml | |
| p3e9.71156a48c0000b32 | 0.69829786 | 89 | symmi cobra advml | |
| o3e9.299c6b49c0000b12 | 0.5498636 | 88 | downloadassistant bundler downloadasist | |
| p3e9.5515e448c0000b32 | 0 | 85 | | |
| p3e9.6125ea48c0001932 | 0.5954974 | 84 | installmonster installmonstr cobra | |
| n3ea.1134ca40d1056b16 | 0.3643235 | 84 | androidos smspay riskware | |
| o3f1.411db2b9c8800b32 | 0.4992854 | 83 | smsreg riskware androidos | |
| p3f0.519a9cc9cc000b12 | 0.3599249 | 81 | barys amonetize riskware | |
| o3e9.3542e96a9128496e | 0.17136991 | 81 | vbkrypt manbat eyestye | |
| p3e7.71156a48c0000b32 | 0.675923 | 79 | icloader symmi kryptik | |
| i3e7.4819a808c0000b20 | 0.8650211 | 78 | androidos cloud dropperagent | |
| o3ef.4914bec9c4000b12 | 0.5070571 | 77 | browsefox yontoo ebnvjn | |
| o3e9.6b914089a6220b16 | 0.25728178 | 75 | virlock nabucur polyransom | |
| o3ed.11999cc1c4000b12 | 0.3766396 | 73 | miuref symmi advml | |

Cluster Detail m3e9.611c96cf656cc6d2

Cluster Size: 788

Cluster Neighbors

| Hash | | Date |
|---|---|---|
| 01c6f9462f217f061f0ea0b6a797c771 | VT | 2017-01-12 07:13:08 -0800 PST |
| 031d6a1802137e4853ab0d43e328d478 | VT | 2016-09-20 19:14:15 -0700 PDT |
| 036d4d8097ba1b44c82f7c850673a01a | VT | 2017-04-02 06:02:46 -0700 PDT |
| 04b2afcc2e0bf8ba7866852560b5bb98 | VT | 2017-03-05 15:14:24 -0800 PST |
| 0704db707b64fda1d2e0e99cb538582c | VT | 2016-08-25 22:41:07 -0700 PDT |
| 0813715051cdd8dc91c9b5da66bb2966 | VT | 2017-03-31 23:15:27 -0700 PDT |
| 08e00328b02b8720b8db3126822244ae | VT | 2016-08-25 21:10:49 -0700 PDT |
| 0a9a88caccbc520a24529c4c88fcdf8c | VT | 2016-08-26 18:11:18 -0700 PDT |
| 0bf2618f0b9931f5748a15ea69b5be15 | VT | 2017-01-29 16:02:59 -0800 PST |
| 0c4b7922282fc427cbfdb0d4349e9034 | VT | 2016-10-04 02:29:58 -0700 PDT |
| 0ce21fe9ea65412ed5f895649f8de7d1 | VT | 2016-08-29 21:13:27 -0700 PDT |
| 0d94aa2c8042ed79c794866575e69d7d | VT | 2017-02-27 12:12:04 -0800 PST |
| 0e11ebfa813a4c44aef53aff885f2afd | VT | 2017-02-03 06:12:57 -0800 PST |
| 0e631f2bd1870cceb28db3f49052e491 | VT | 2017-01-19 12:14:24 -0800 PST |
| 0f47f81b279124e7845daad4600a8d0c | VT | 2017-01-08 07:12:16 -0800 PST |
| 0fc1ca30d66dee269aa8aa2e305a546d | VT | 2016-11-20 00:15:25 -0800 PST |
| 0fde13872e41033ddb264bbd7078038e | VT | 2016-08-27 02:15:02 -0700 PDT |
| 10020f377a7a4c8ad88904acbcc407b5 | VT | 2017-01-13 08:13:20 -0800 PST |
| 10281e803b01e0fc05e87fecdec0424a | VT | 2016-12-22 13:01:08 -0800 PST |
| 11365615b095f99b7bc9908538894651 | VT | 2017-01-22 21:13:12 -0800 PST |
| 12c2b62512048ccaf0b1c0b32053ca07 | VT | 2017-04-10 06:09:40 -0700 PDT |
| 13577cfd9d50430af1f7157432f7ada4 | VT | 2017-03-31 20:06:26 -0700 PDT |
| 13a3a8d542b7e106220ed70269350a0a | VT | 2017-04-02 07:04:10 -0700 PDT |
| 15963681d2509f004f462c9bc8c6ccfd | VT | 2017-04-10 06:01:42 -0700 PDT |
| 1626606bb02f56a3390b62646a1dc03e | VT | 2016-08-25 14:18:42 -0700 PDT |

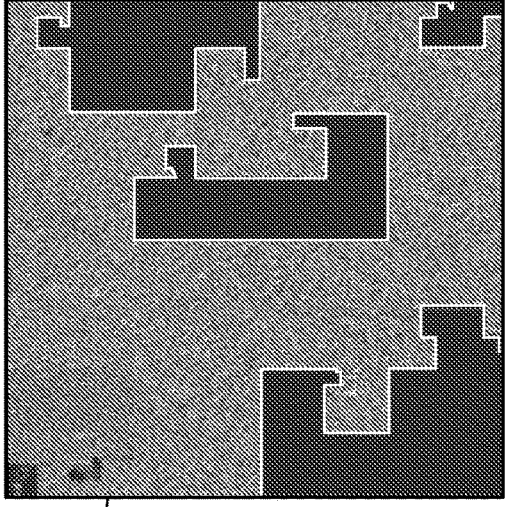
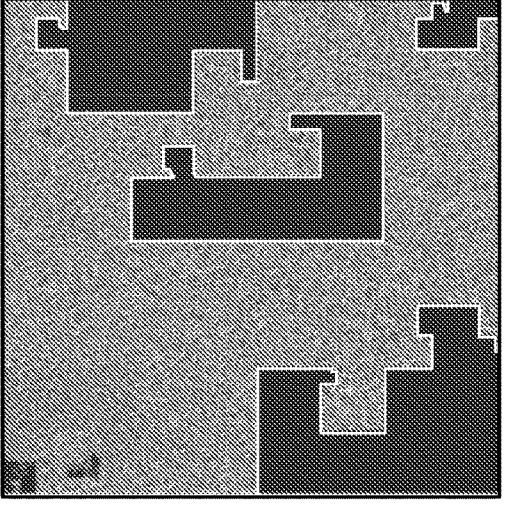
FIG. 18

FIG. 19 virustotal — 1906

SHA256: d5aa600a75073962fc07873e3cddab70ce777eee7ca8adb6b9
File name: vxqeebjj.exe — 1914
Detection ratio: 56 / 61
Analysis date: 2017-03-31 12:34:37 UTC (3 weeks, 5 days ago)

☰ Analysis ⊕ File detail ⇄ Relationships ⊙ Additional information

| Antivirus | Result |
| --- | --- |
| Ad-Aware | Win32.Worm.Allaple.Gen |
| AegisLab | W32.W.Allaple.kYJb |
| AhnLab-V3 | Win-Trojan/Starman.Gen |
| ALYac | Win32.Worm.Allaple.Gen |
| Antiy-AVL | Virus/Win32.Virut.ce |
| Arcabit | Win32.Worm.Allaple.Gen |
| Avast | Win32:Allaple [Wrm] |
| AVG | Win32/Virut.AA |
| Avira (no cloud) | WORM/Allaple.gcuzf |
| AVware | Net-Worm.Win32.Allaple.gen( |
| Baidu | Win32.Trojan.Kryptik.gf |
| BitDefender | Win32.Worm.Allaple.Gen |
| CAT-QuickHeal | W32.Virut.Cur1 |
| ClamAV | Win.Worm.Allaple-149 |

1910 — 1902 — 1912 virustotal — 1908

SHA256: ea733b675889c5483239f7bfe7e6eea9d500872707fabce3a89
File name: brvrjrke.exe — 1916
Detection ratio: 56 / 59
Analysis date: 2017-02-27 08:43:11 UTC (1 month, 4 weeks ago)

☰ Analysis ⊕ File detail ⇄ Relationships ⊙ Additional information

| Antivirus | Result |
| --- | --- |
| Ad-Aware | Win32.Worm.Allaple.Gen |
| AegisLab | W32.W.Allaple.kYJb |
| AhnLab-V3 | Win-Trojan/Starman.Gen |
| ALYac | Win32.Worm.Allaple.Gen |
| Antiy-AVL | Virus/Win32.Virut.ce |
| Arcabit | Win32.Worm.Allaple.Gen |
| Avast | Win32:Allaple [Wrm] |
| AVG | Win32/Virut.AA |
| Avira (no cloud) | WORM/Allaple.gcuzf |
| AVware | Net-Worm.Win32.Allaple.gen (v |
| Baidu | Win32.Trojan.Kryptik.gf |
| BitDefender | Win32.Worm.Allaple.Gen |
| Bkav | W32.CrypticB.Trojan |

1904 — 1918

0f33bdbedea51ee73c3a5da111ad103c

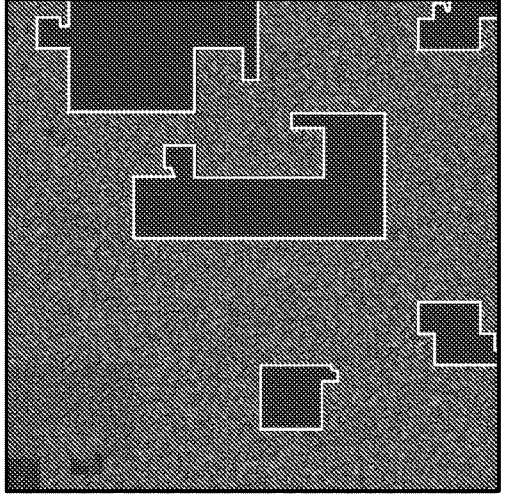
— 2106

02f4cc2e395abcb99d1a93efb3238a84

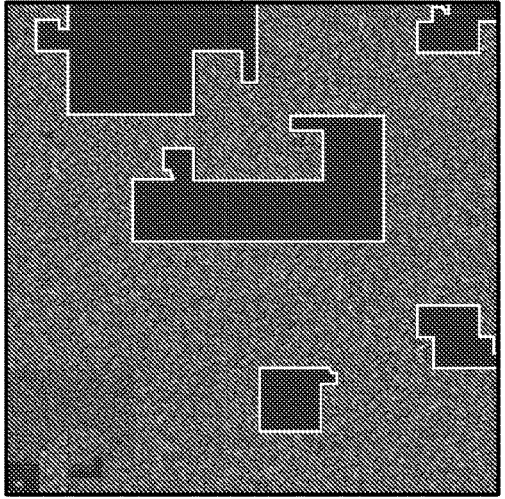
— 2108

Cluster: m3e9.611c96cf656cc2d2 with 953 members
md5: 0f33bdbedea51ee73c3a5da111ad103c
sha1: 59a6e8a590a80a0ce58c78729536f3b60205bc4d — 2114
sha256: e31f96b12c849f1d3e19b69a0866baab44e4cf9463deafb3f3c42689c68fb0
First Observation: 2016-12-07T15:06:22-08:00
mimeType: Windows PE
TLP: yellow
Location: /samples/p1/malware/2016/12/07/0f33bdbedea51ee73c3a5da111ad103c
YARA Signature: Available
Locus:
7D6D69787D87787797D7F8A87807C7E837D838A7D886A043B1A001B79433
VT Report — 2110

Cluster: m3e9.611c96cf656cc2d2 with 953 members
md5: 02f4cc2e395abcb99d1a93efb3238a84
sha1: d76022b3f9a767c68de3671db34e7f31d402a4c
sha256: 60899380e39face37a1cd4c0a60ed2cf95edb4c67f0be15b7ba060abbcd29e6 — 2116
First Observation: 2016-12-15T21:11:30-08:00
mimeType: Windows PE
TLP: yellow
Location: /samples/p1/malware/2016/12/16/02f4cc2e395abcb99d1a93efb3238a84
YARA Signature: Available
Locus:
796E6A777F87887B7D7F89857F7D7F837D83897D886A043B1A001B7943393012 1A17
1164926F
VT Report — 2112

— 2102
— 2104

FIG. 21 virustotal

2206

SHA256: e31f96b12c849f1c3e19b69a0866baab44e4cf9463deafb3f3c42689c68ff0

File name: 0f33bdbedea51ee73c3a5da111ad103c.virus

Detection ratio: 56 / 56  — 2214

Analysis date: 2016-12-08 06:33:04 UTC ( 4 months, 2 weeks ago )

≡ Analysis  ⊕ File detail  ⊙ Additional information  ⌕ Comments  ♡ Votes  ⓪

| Antivirus | Result |
|---|---|
| Ad-Aware | Win32.Worm.Allaple.Gen |
| AegisLab | W32.W.Allaple.kYJb |
| AhnLab-V3 | Win-Trojan/Starman.Gen |
| ALYac | Win32.Worm.Allaple.Gen |
| Antiy-AVL | Virus/Win32.Virut.ce |
| Arcabit | Win32:Vitro |
| Avast | Win32/Virut |
| AVG | WORM/Allaple.gcuzf |
| Avira (no cloud) | Net-Worm.Win32.Allaple.gen(v) |
| AVware | Win32.Virus.Virut.gen |
| Baidu | Win32.Worm.Allaple.Gen |
| BitDefender | W32.CrypticB.Trojan |
| Bkav | |

2210 ⟩ 2212 virustotal

2208

SHA256: 608999380e39face37a1cd4c0a60ed2cf95ed04c67f0be15b7ba060abbcd29e

File name: 0214cc2e395abcb99d1a93efb3238a84.virus

Detection ratio: 52 / 57  — 2216

Analysis date: 2016-12-07 15:16:08 UTC ( 4 months, 2 weeks ago )

≡ Analysis  ⊕ File detail  ⊙ Additional information  ⌕ Comments  ♡ Votes  ⓪

| Antivirus | Result |
|---|---|
| Ad-Aware | Win32.Worm.Allaple.Gen |
| AegisLab | W32.W.Allaple.kYJb |
| AhnLab-V3 | Win-Trojan/Starman.Gen |
| ALYac | Win32.Worm.Allaple.Gen |
| Antiy-AVL | Virus/Win32.Virut.ce |
| Avast | Win32:Vitro |
| AVG | Worm/Allaple.H |
| Avira (no cloud) | WORM/Allaple.gcuzf |
| AVware | Net-Worm.Win32.Allaple.gen(v) |
| Baidu | Win32.Virus.Virut.gen |
| BitDefender | Win32.Worm.Allaple.Gen |
| Bkav | W32.CrypticB.Trojan |
| CAT-QuickHeal | W32.Virut.Cur1 |

SYSTEM AND METHOD FOR CLUSTERING FILES AND ASSIGNING A MALICIOUSNESS PROPERTY BASED ON CLUSTERING

CROSS-REFERENCE TO OTHER APPLICATIONS

This application claims priority to U.S. Provisional Patent Application No. 62/543,834 entitled CLUSTERING FILES filed Aug. 10, 2017 which is incorporated herein by reference for all purposes.

BACKGROUND OF THE INVENTION

Nefarious individuals seek to compromise computing systems for a variety of reasons. One way such compromises can be achieved is through the distribution of malicious software to target computers which then execute the malicious software. One way to help protect a computing system from compromise is to prevent malicious software from reaching it. As one example, computer security companies offer products that use blacklists of known malicious software to intercept malicious software or otherwise prevent it from ultimately executing on a computing system. Unfortunately, such blacklists have limitations. As one example, attackers can make subtle changes to existing malicious software (e.g., that is present on a blacklist) resulting in a version of the malicious software that is not present on the blacklist.

BRIEF DESCRIPTION OF THE DRAWINGS

Various embodiments of the invention are disclosed in the following detailed description and the accompanying drawings.

FIG. 6 illustrates an example of python kernel code implementing an embodiment of a transformation engine.

FIG. 7 illustrates an example of Java code implementing an embodiment of a transformation engine.

FIG. 11 depicts an example of a daily cluster report.

FIG. 17 depicts an example of a cluster detail report.

FIG. 18 illustrates portions of two different sample reports, depicted side-by-side for comparison.

FIG. 19 illustrates portions of two different VirusTotal reports, depicted side-by-side for comparison.

FIG. 21 illustrates portions of two different sample reports, depicted side-by-side for comparison.

FIG. 22 illustrates portions of two different VirusTotal reports, depicted side-by-side for comparison.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
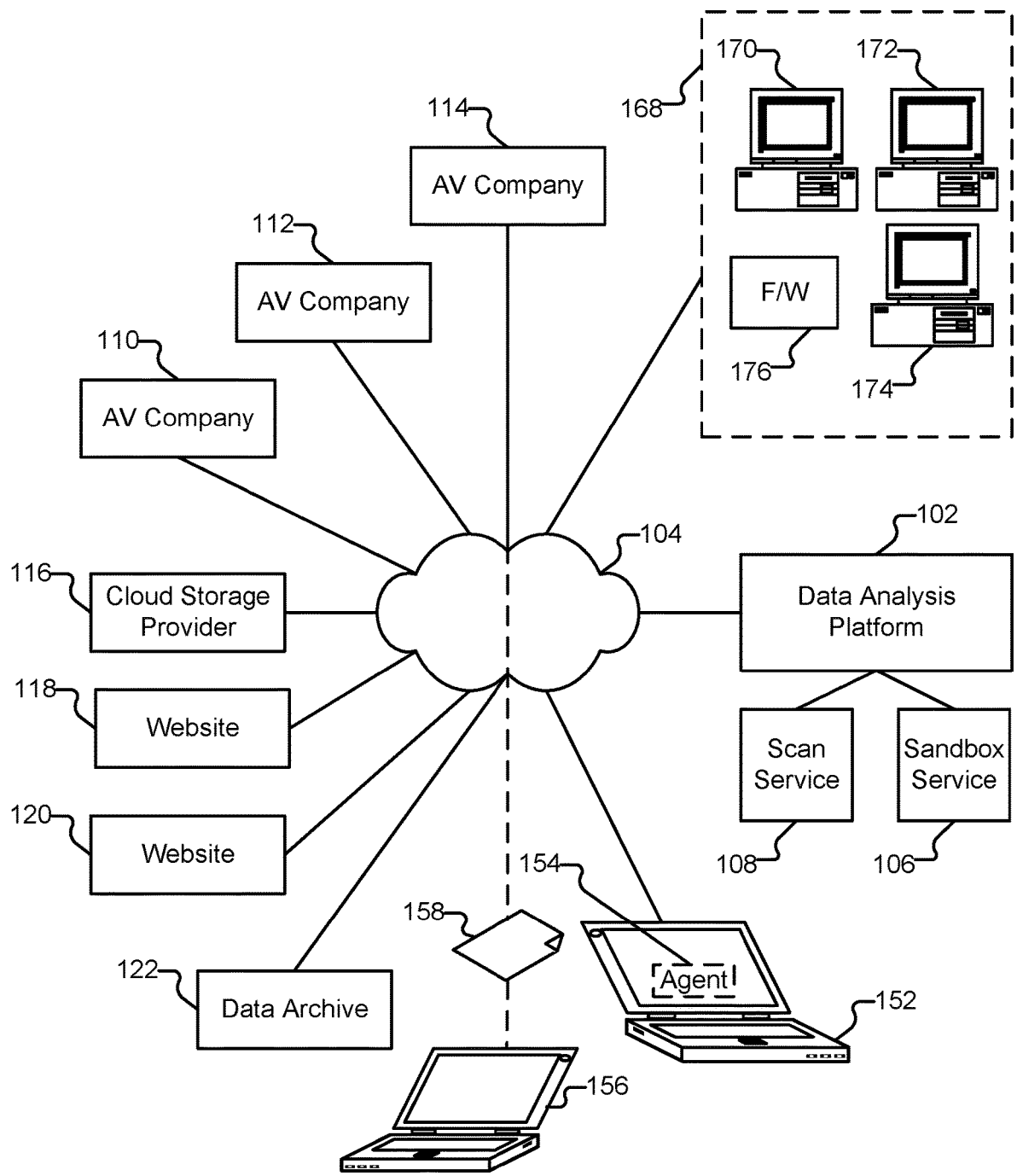
FIG. 1 illustrates an embodiment of an environment in which data is analyzed.

FIG. 1 illustrates an embodiment of an environment in which data is analyzed. An example of data that can be analyzed (e.g., by data analysis platform 102) using techniques described herein is a potentially malicious file (also referred to herein as a "sample"). Such files can take a variety of forms, including Windows executables, Adobe PDFs, etc. Other types of data can also be analyzed using the techniques described herein and the techniques adapted as applicable. In particular, described herein are techniques for clustering similar files by transforming a received file's contents using a space-filling curve, down-sampling the transformed result (obtaining a "locus"), and (optionally) performing a hashing operation on the locus. Using techniques described in more detail below, information about previously examined samples can be used to help obtain information about newly obtained samples.

Data analysis platform 102 is configured to receive files for analysis from a variety of sources, via one or more networks (depicted collectively in FIG. 1 as network cloud 104). Such files can be pushed to platform 102 and/or pulled by platform 102, as applicable. For example, anti-virus companies (110-114) can each send files to platform 102 for analysis. Examples of such companies include McAfee, Kaspersky, and Sophos. In some embodiments, at least some of the anti-virus companies cooperate with one another to share samples. For example, the companies can participate in a malware exchange. Platform 102 can be a member of the exchange, and can also operate the exchange, as applicable. As will be described in more detail below, platform 102 can make available results of its analysis of samples to companies 110-114 (or other entities), such as in a daily digest of newly-observed samples and associated information.

Another source of files is cloud storage provider 116, which can use the services of platform 102 to evaluate the files that cloud storage provider 116's customers upload (e.g., in conjunction with an uploading operation, and/or while the files are at rest on cloud storage provider 116's infrastructure). Examples of cloud storage providers include Box.net and Dropbox. Platform 102 can also be configured to collect files from websites, such as websites 118-120 (e.g., by crawling or scraping such websites) or other types of sites (e.g., FTP sites). The identities of the websites can be acquired by platform 102 in a variety of ways, including by platform 102 operating a DNS-based blackhole list, and by receiving domain identifiers from companies 110-114 (e.g., as part of the malware exchange). As yet another example, platform 102 can be configured to access files stored in data archive 122. One example of data archive 122 is the Internet Archive, accessible at archive.org.

Yet another source of files is a security or other appliance operating in a corporate or other applicable environment. As one example, suppose firewall 176 provides security for corporate network 168. Example tasks performed by firewall 176 include the scanning of email attachments (e.g. sent by and/or to users of nodes 170-174) and scanning of files that users of corporate network 168 download from websites. Firewall 176 includes resources such as whitelists/blacklists of signatures of known good/bad files, which it can use in determining whether to allow/deny nodes 170-174 access to particular files. In some cases, firewall 176 may not have a signature for a file. In that case, firewall 176 can transmit a copy of the file (or, as applicable, a representation thereof, such as an MD5 hash) to platform 102 for further analysis.

In various embodiments, platform 102 is configured to provide protection (whether directly or indirectly) to endpoint devices, such as laptop 152 (or any other appropriate device, such as a mobile phone, tablet, desktop computer, gaming console, etc.). Laptop 152 can have installed on it an agent 154 (or other appropriate software, such as a browser plug-in) which examines email attachments, web downloads, and/or other files present on or received by laptop 152, and obtains information (e.g., about whether the file is benign or malicious) from platform 102. Similarly, the functionality described herein as being provided by agent 154 can be incorporated into firewall 176 directly (e.g., as a module, library or set of libraries, plugin(s), etc.) and can also be provided to appliance 176 as a separate component (e.g., one in communication with firewall 176 but physically separate from it).

As will be described in more detail below, data analysis platform 102 is configured to perform analysis on the files it receives. In various embodiments, data analysis platform 102 is further configured to provide files to sandbox service 106 and scan service 108 for additional processing and to receive reports back from those services. Sandbox service 106 is configured to execute the samples it receives in a sandbox, and observe/record any potentially malicious actions the samples take. An example of a sandbox service 106 is ThreatGRID. Scan service 108 is configured to check samples using a plurality of instrumented antivirus engines. An example of a scan service is VirusTotal. As shown in FIG. 1, services 106 and 108 are operated separately from platform 102. In various embodiments, the functionality is provided on platform 102 in addition to or instead of using third party service providers.

Data analysis platform 102 is illustrated as a single logical device in FIG. 1. Multiple embodiments of platform 102 can exist in the same environment (e.g., with one embodiment collocated with cloud storage provider 116 and/or data archive 122, and one embodiment operating separately and independently). In various embodiments, platform 102 is a scalable, elastic architecture and can comprise several distributed components, including components provided by one or more third parties (and/or components working in conjunction with infrastructure provided by a third party) as applicable. Further, when platform 102 is referred to as performing a task, such as storing data or processing data, it is to be understood that a sub-component or multiple sub-components of platform 102 (whether individually or in cooperation with third party components) may cooperate to perform that task. Similarly, whenever a component of platform 102 is described as performing a task, a subcomponent may perform the task and/or the component may perform the task in conjunction with other components. Components of an embodiment of platform 102 will now be described.

Figure 2:
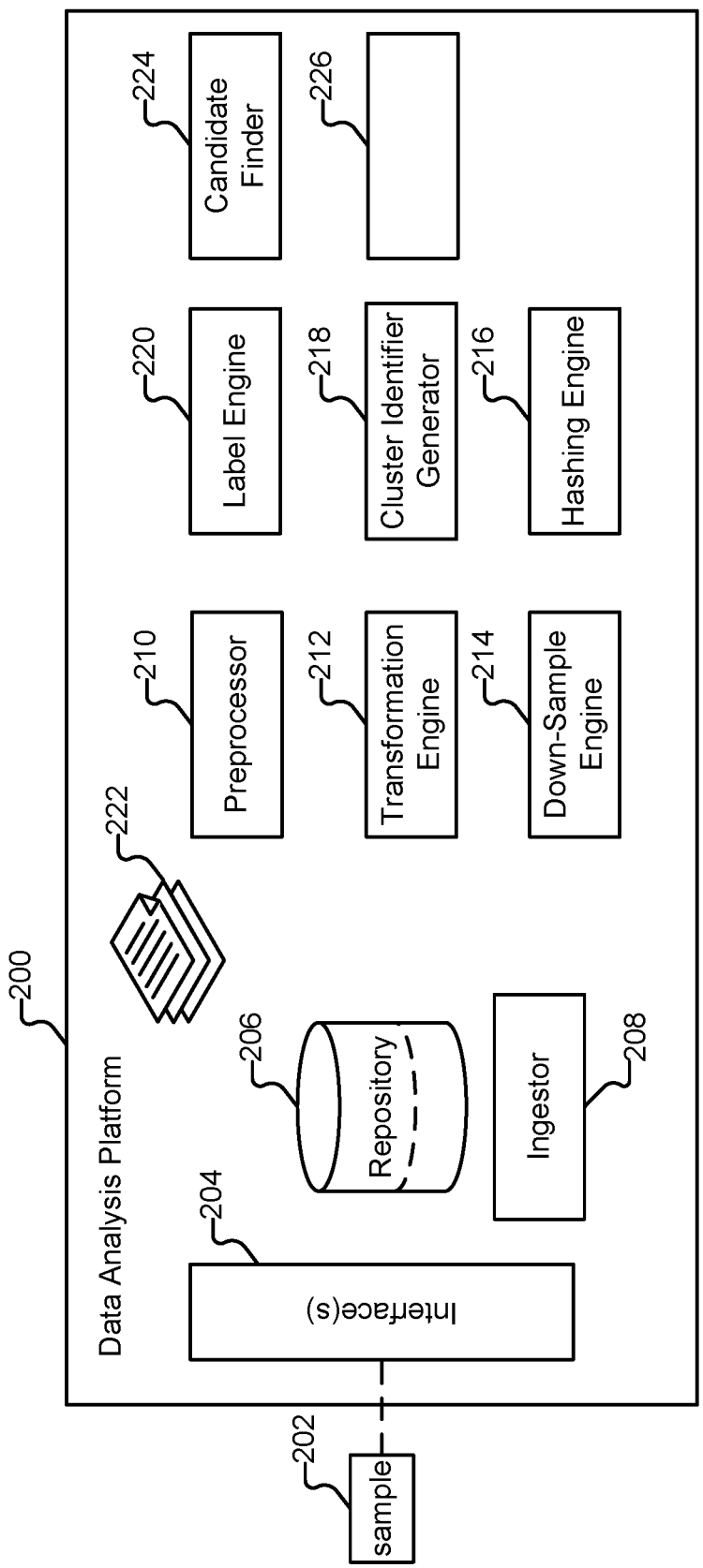
FIG. 2 illustrates an embodiment of a data analysis platform.

FIG. 2 illustrates an embodiment of a data analysis platform. Platform 200 is an embodiment of platform 102. Samples (e.g., sample 202) are received for analysis by platform 200 via one or more interfaces 204. As will be described in more detail below, received samples (and information associated with the samples) are stored in repository 206. In various embodiments, repository 206 is made up of multiple databases or other stores. In the example shown in FIG. 2, repository 206 comprises two tiers of storage. The first tier comprises a sharded version of Redis—an open-source, networked, in-memory, key-value data store. Other technologies can also be used, for example, Apache Cassandra can be used instead of Redis. The second tier comprises a clustered file system (CFS). The remaining components of platform 200 will be described in conjunction with the receipt of a sample.

Suppose laptop 152 is a personal computer owned by a user hereinafter referred to as Alice. As previously mentioned, laptop 152 has installed on it an agent 154, which helps secure Alice's laptop against threats posed by malicious files. Whenever Alice attempts to execute a file on laptop 152, agent 154 determines whether such execution should be permitted. In one embodiment, agent 154 consults white/black lists locally stored on Alice's laptop to determine whether the execution of a program should be permitted. In the event the program is not present on any such local lists, agent 154 then consults platform 200. In a second embodiment, local white/black lists are not used, and agent 154 consults platform 200 without performing a local determination. In the following examples, suppose that agent 154 does not have local information about the files Alice attempts to execute (either because the files she attempts to execute are not included in the locally stored white/black lists, in the case of the first embodiment, or because local white/black lists are not used, in the case of the second embodiment).

Example: Known Good File

As a first example, suppose Alice attempts to run calculator.exe, a legitimate calculator application that is provided by her operating system (e.g., Windows 7). Agent 154 determines an MD5 hash value for calculator.exe and transmits the MD5 hash value to platform 200. In various embodiments, platform 200 stores (or is otherwise able to access, e.g. over a network) third party datasets (222). Two examples of third party datasets include the Microsoft Clean-File MetaData and the National Software Reference Library (NSRL), both of which include information about commercial software. When platform 200 receives the MD5 hash value of Alice's copy of calculator.exe, platform 200 will readily determine (e.g., by matching it against the Microsoft Clean-File MetaData) that calculator.exe is a known good application and report back to agent 154 that execution of calculator.exe should be permitted.

Example: Known Malicious File

As a second example, suppose Alice unwittingly visits a malicious website and is subjected to a drive-by download attack as a result. The malicious executable that is downloaded to her computer (e.g., "totally_harmless.bat") is commonly used in such attacks. Prior to the execution of totally_harmless.bat, agent 154 determines an MD5 hash value for totally_harmless.bat and transmits the MD5 hash value to platform 200. When platform 200 receives the MD5 hash value of Alice's copy of totally_harmless.bat, platform 200 can determine (e.g., by consulting a known-malicious data set included among datasets 222, and/or resources stored in repository 206 and described in more detail below) that totally_harmless.bat is a known malicious application, and report back to agent 154 that execution of totally_harmless.bat should be blocked on Alice's laptop 152.

Example: Unknown File

In some cases, an MD5 hash value sent to platform 200 will not be present in dataset 222. In the following example, suppose that Bob, a nefarious individual using laptop 156, would like to compromise Alice's computer. Bob (e.g., masquerading as a shipping company), sends Alice an email message with a Windows executable as an attachment 158 ("invoice.exe") purporting to be an unpaid invoice.

As with the previous examples, agent 154 determines an MD5 hash value for invoice.exe and transmits the MD5 hash value to platform 200. And, as with the previous examples, platform 200 checks the received MD5 hash value against datasets 222. However, in this case, suppose the received MD5 hash value is not present in datasets 222. Platform 200 further checks repository 206 for the received MD5 hash value (e.g., by performing a Redis query). In this example, suppose the received MD5 hash value (e.g., "d6edbcb65a46704450a54fe4ae6b7cdd") is not present in repository 206, either. Platform 200 can instruct agent 154 to provide a copy of attachment 158 to platform 200 for additional analysis.

Attachment 158 is an example of a sample 202 (shown in FIG. 2) that platform 200 can receive via interface 204 (e.g., using SFTP) for analysis. Upon receipt of sample 202, in some embodiments, ingestor 208 (implemented, e.g., as a set of one or more scripts written in an appropriate scripting language, such as python or Java) confirms whether platform 200 has previously seen the identical sample (and therefore need not process it again) by taking an MD5 (or other appropriate) cryptographic hash of the sample and checking whether that MD5 hash value is present in repository 206 (e.g., by performing a Redis query).

In this example, the MD5 hash value for the newly received "invoice.exe" is confirmed by ingestor 208 to be the value previously transmitted by agent 154 (e.g., "d6edbcb65a46704450a54fe4ae6b7cdd") and ingestor 208 determines that its MD5 hash value is not present in repository 206. Platform 200 stores a copy of sample 202 in repository 206, using the MD5 hash value to reference the file. In some embodiments, additional information associated with the file is also stored in repository 206 (e.g., as metadata), such as the source of the sample, the filename of the sample, etc. The file is then queued (e.g., using a queuing/messaging system such as ZeroMQ, Nats, or Kafka) for further processing. In some embodiments, previously-unseen samples (i.e., based on the MD5 value not being present in repository 206) are dispatched, in parallel with the processing performed by platform 200, to scan service 108 and/or sandbox service 106. In other embodiments, the sample is dispatched to those services after the processing by platform 102 is complete (and, e.g., a determination has been made by platform 102 that the sample is not closely related to an existing known sample). In yet other embodiments, only a subset of newly seen samples are dispatched to services 108/106, as described in more detail below.

Preprocessor 210 is configured to listen for ZeroMQ "advice" that a new sample has arrived in the queue. In some embodiments, preprocessor 210 is a Java or Go program. Preprocessor 210 can also be implemented using one or more python scripts or other appropriate technologies. Preprocessor 210 determines what type of file sample 202 is (e.g., its MIME filetype) and selects an appropriate helper to perform the preprocessing. In this example, sample 202 is a Windows executable, so preprocessor 210 selects a Windows PE helper to extract the PE container from the executable and verify it. Another example of a helper is a PDF helper, configured to extract executable code from PDF files. In some embodiments, if the helper is unable to parse the file (e.g., the PE container is malformed), or if an appropriate helper is not present on platform 102 for the received sample file type, platform 102 is configured to send a copy of the sample to sandbox service 106 for additional analysis (e.g., to see whether sample 202 can be executed by sandbox service 106).

Suppose sample 202 is well-formed (i.e., it can be parsed by preprocessor 210 working in conjunction with a Windows PE helper). Preprocessor 210 is configured to iterate over the data sections of the PE container (which are enumerated in the header) and create a bytestream (e.g., a vector or array of bytes) corresponding to the sample. In this example, one portion of the bytestream corresponds to the program executable code extracted from the PE, another portion of the bytestream corresponds to initialized variables, another portion of the bytestream corresponds to the uninitialized variables, and another portion of the bytestream corresponds to debug data in the linking code, etc. Bytestreams of other types of files can also be constructed by preprocessor 210 working in conjunction with an appropriate helper. In some cases, the code section in a Windows PE may be obfuscated. This obfuscation could be done for purposes of digital rights management, but could also be done by a malware author to make malware analysis more difficult. Such obfuscation does not thwart the processing performed by platform 102, as will be described in more detail below.

Once preprocessor 210 has completed generating a bytestream for sample 202, it provides the bytestream to transformation engine 212 (implemented using one or more Java programs, python scripts, or other appropriate technologies), which will transform the bytestream (i.e., from one dimension to two dimensions) using a space-filling curve. One example of a space-filling curve is a Hilbert curve, which is used in various embodiments by transformation engine 212. Other space-filling curves can also be used and the techniques described herein adapted accordingly. Examples of such other space-filling curves include Z-order curves, Peano curves, Moore curves, fractals with a Hausdorff dimension of 2, etc.

One additional task performed by preprocessor 210 (e.g., performed prior to generating a bytestream for sample 202) is to select an order for a Hilbert curve that is of an appropriate size. In particular, preprocessor 210 selects an order that results in a curve size that is larger than the bytestream. In some embodiments, the size decision is further based on a requirement that a minimum amount of negative space be present in the Hilbert curve (e.g., a minimum of fifteen percent negative space). A Hilbert order is $4_n$ (i.e., $2^n$ squared). Preprocessor 210 creates two arrays of the same size in memory—one that will hold the bytestream, and one (initialized to zero) that will hold the bytestream after the transformation using a Hilbert curve (also referred to herein as a "mapping") has been performed.

Figure 3:
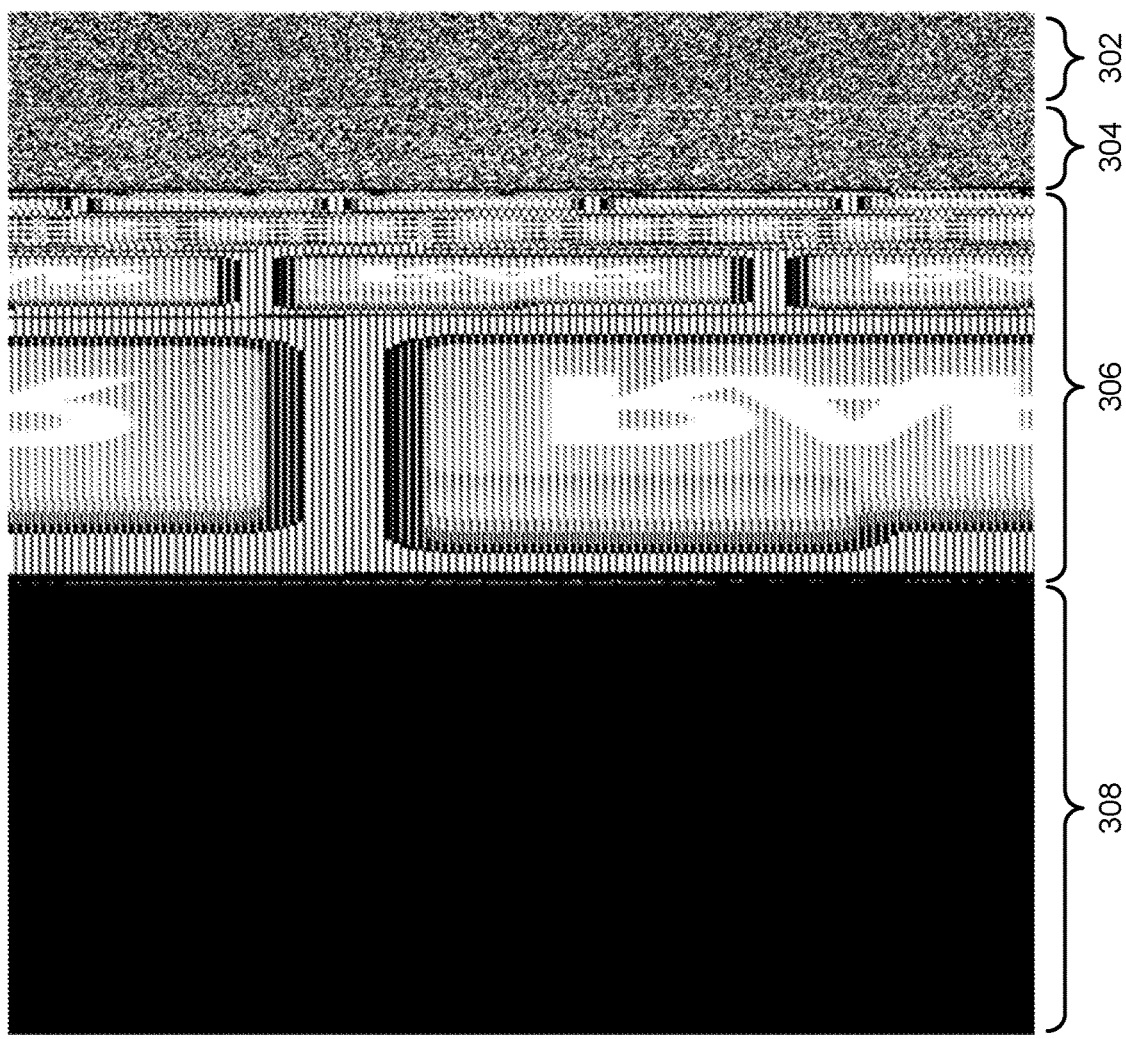
FIG. 3 illustrates an example of a graphical representation of a bytestream prior to the application of a Hilbert mapping operation.

A graphical representation of a bytestream is depicted in FIG. 3. In the example shown in FIG. 3, the bytestream has been placed in a square of appropriate size, but the Hilbert mapping has not yet been performed by transformation engine 212. Suppose the received sample that resulted in the bytestream depicted in FIG. 3 is a Windows executable where portions were packed using the UPX packer. The first portion of the bytestream representation (302) corresponds to one packed portion. The second portion of the bytestream representation (304) corresponds to a second packed portion. Note that there are visual differences between the two packed portions. The third portion of the bytestream representation (306) corresponds to a .rsrc file. The remainder of the representation (308) corresponds to empty space.

Figure 4:
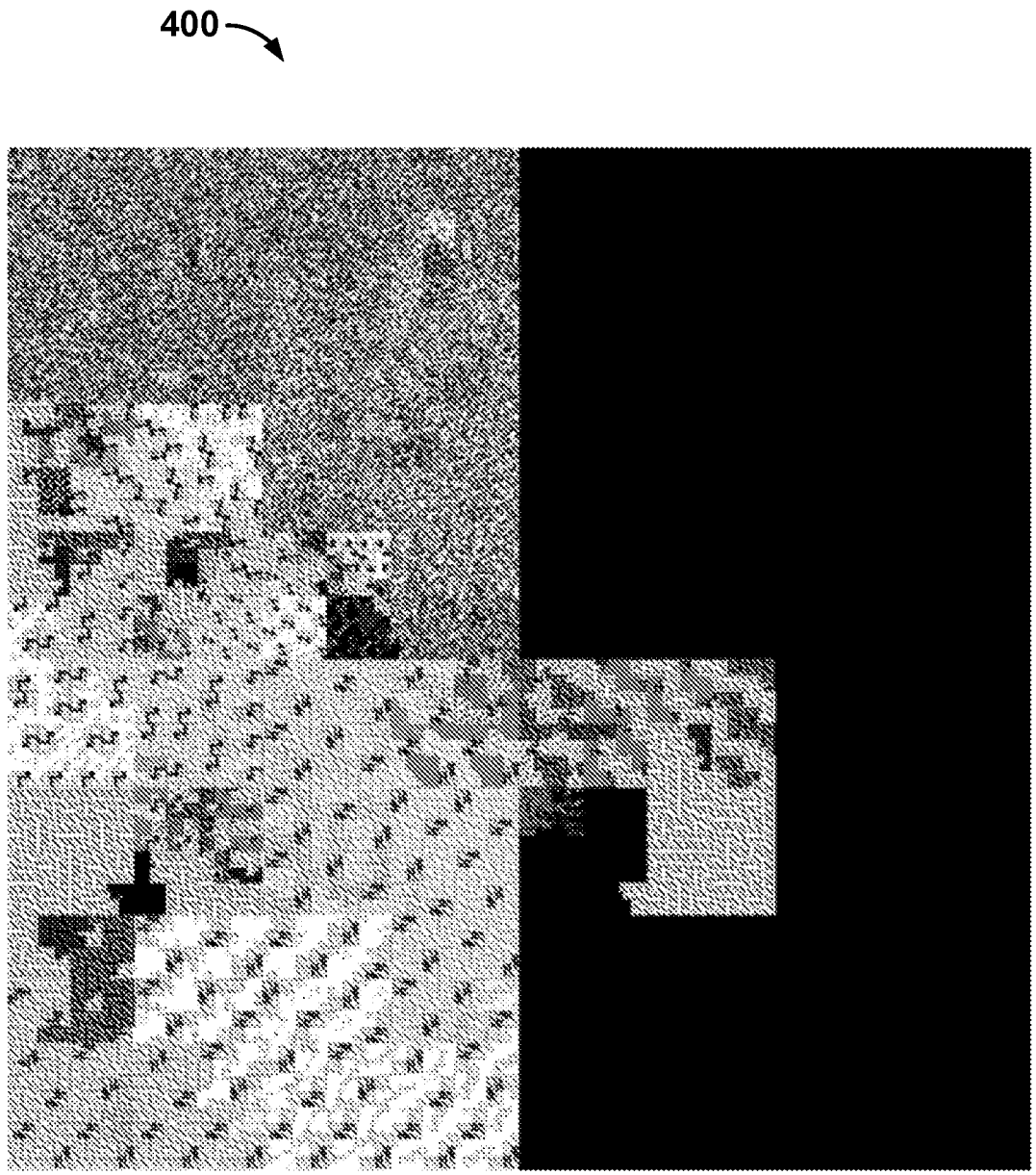
FIG. 4 illustrates an example of a graphical representation of a bytestream after the application of a Hilbert mapping operation.

FIG. 4 illustrates an example of a graphical representation of a bytestream after a Hilbert curve mapping has been applied (e.g., by transformation engine 212). In particular, FIG. 4 depicts the representation shown in FIG. 3 after the mapping has been applied.

Figure 5:
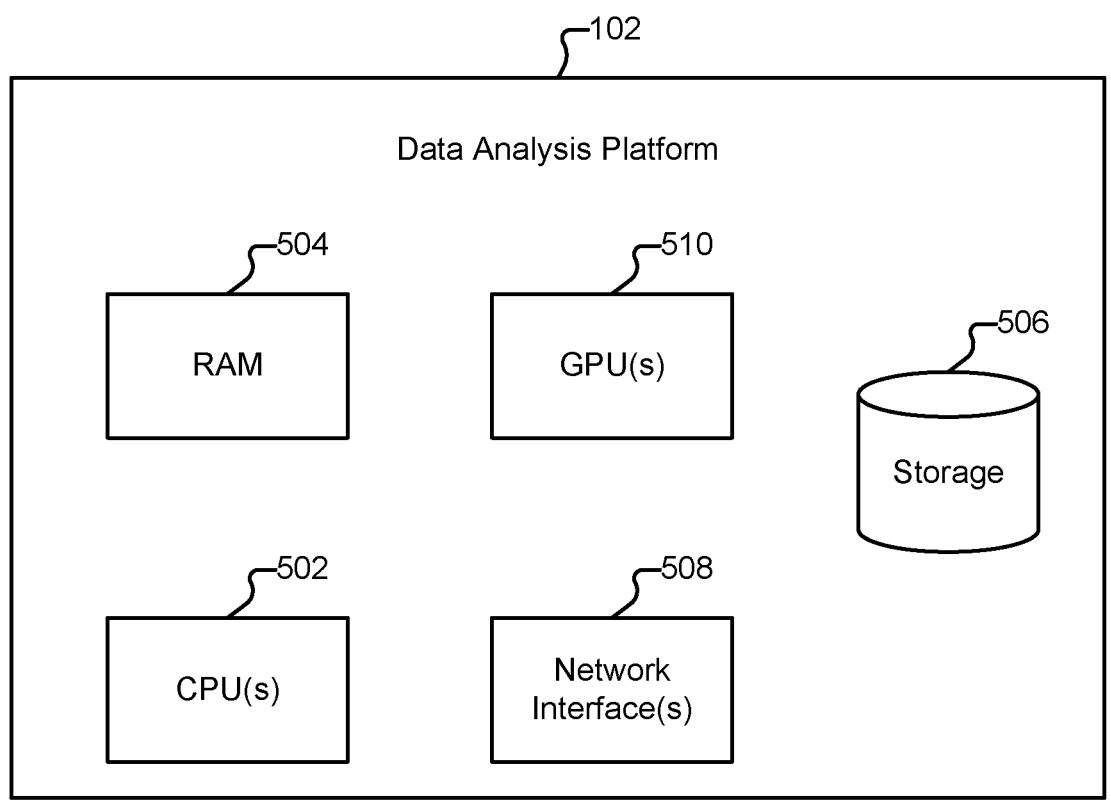
FIG. 5 illustrates an embodiment of a data analysis platform.

FIG. 5 illustrates an embodiment of a data analysis platform. The example shown is a representation of physical components that can be included in various embodiments of platform 102. Specifically, platform 102 includes commodity server-class hardware such as a high performance multi-core CPU 502 and RAM 504 (e.g., 32G of RAM) running a server-class operating system (e.g., Linux-based). Platform 102 also includes a storage 506 (such as one or more solid state disks) and one or more network interfaces 508 (e.g., Gigabit Ethernet). Platform 102 can also include one or more optional hardware accelerators. For example, platform 102 can include one or more graphics processing units (GPUs) 510 which can efficiently perform vector operations such as performing Hilbert curve mapping operations. For example, using typical commodity hardware, a given sample can be analyzed using the techniques described herein on the order of tens or hundreds of milliseconds per core. In various embodiments, platform 102 includes one or more accelerated processing units (APUs) instead of or in addition to having separate CPU(s) 502 and GPU(s) 510. Other accelerators, such as ASICs and FPGAs, can also be used and the techniques described herein adapted as applicable.

In some embodiments, the bytestream data stored in the first array (created by preprocessor 210) is mapped into the second array by transformation engine 212 as follows. The first and second arrays are copied from RAM 504 to GPU 510. In some embodiments, transformation engine 212 is implemented as kernel code, which is written in OpenCL and executed in GPU 510 (or an APU, as applicable). Two examples of kernel code for performing a Hilbert curve mapping are shown in FIGS. 6 and 7, respectively. FIG. 6 shows an example of python kernel code used in some embodiments to implement transformation engine 212. FIG. 7 shows an example of a Java implementation of transformation engine 212 that uses AMD Aparapi, which leverages Java code bytecode into OpenCL.

The mapping function that Hilbert or any other space-filling technique provides is to map an index to a coordinate. In the case of platform 102, a byte in a file is mapped to a 2D coordinate. Where platform 102 includes a GPU (or APU), the maps are calculated using a kernel and GPU (or APU). The maps can also be generated on embodiments of platform 102 that do not include a GPU (or APU), by using an approach such as the following. The maps are different for different sized files, bucketed into 4' size buckets. Fifteen different maps are pre-computed (and, e.g., included with embodiments of transformation engine 212 rather than being computed by transformation engine 212 on initialization). Calculating the size of all maps for Hilbert orders <=15 requires approximately 1.5G of RAM. Once the maps are available, embodiments of CPU 502 can look up from the map/table the coordinate instead of computing the coordinate.

Returning to the descriptions of FIGS. 2 and 5, once transformation engine 212 finishes performing the mapping to a Hilbert curve, the second array (i.e., holding the newly mapped information) is copied back to RAM 504 and the first array (i.e., holding the unmapped bytestream) is discarded. Specifically, the second array (holding the mapped information) is provided to down-sample engine 214, which can be implemented using a Java program, a set of one or more python scripts, or 'C' code etc., as applicable.

Figure 8:
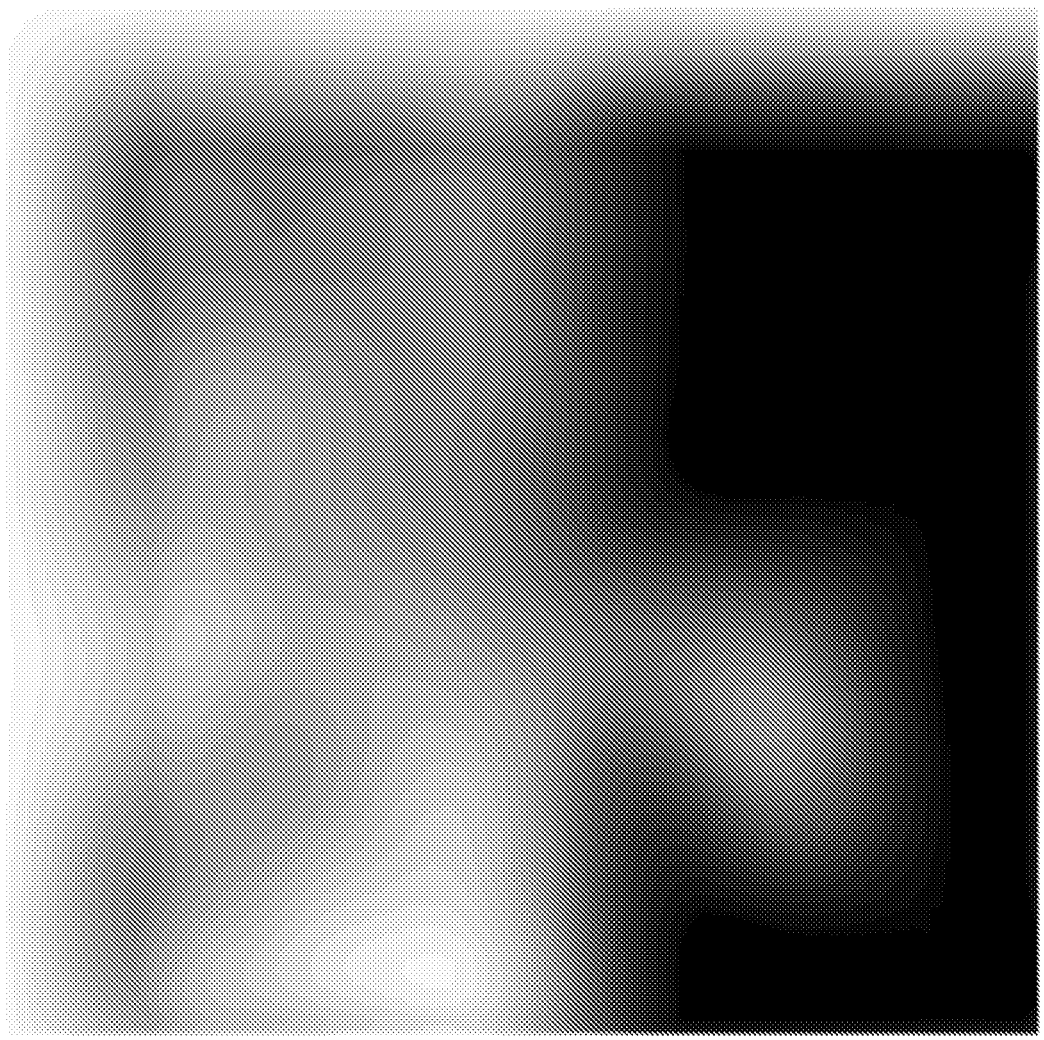
FIG. 8 illustrates an example of data after a blur operation has been performed.

Down-sample engine 214 is configured to reduce the size of the second array while maintaining at least some of its entropy. A variety of approaches can be used. As one example, down-sample engine 214 can perform a blur operation on the contents of the second array. The blur operation can optionally employ anti-aliasing. An example of Hilbert curve 400 after a blur operation has been performed is depicted in FIG. 8. Examples of open source blur engines that can be used by down-sample engine 214 include the Python Imaging Library (PIL), ImageMagick, and Java Development Kit (JDK). In addition to performing a blur operation, down-sample engine 214 is further configured to perform a resize operation (resulting in what is referred to herein as a "locus"). For example, where a Hilbert curve of size 256 is used, the image can be resized to a locus that is a 16 pixel×16 pixel image (of 256 bit grayscale). Where a Hilbert curve of size 64 is used, the image can be resized to locus that is an 8 pixel×8 pixel image (also of 256 bit grayscale). Other dimensions can also be used and the techniques described herein adapted as applicable.

Figure 9:
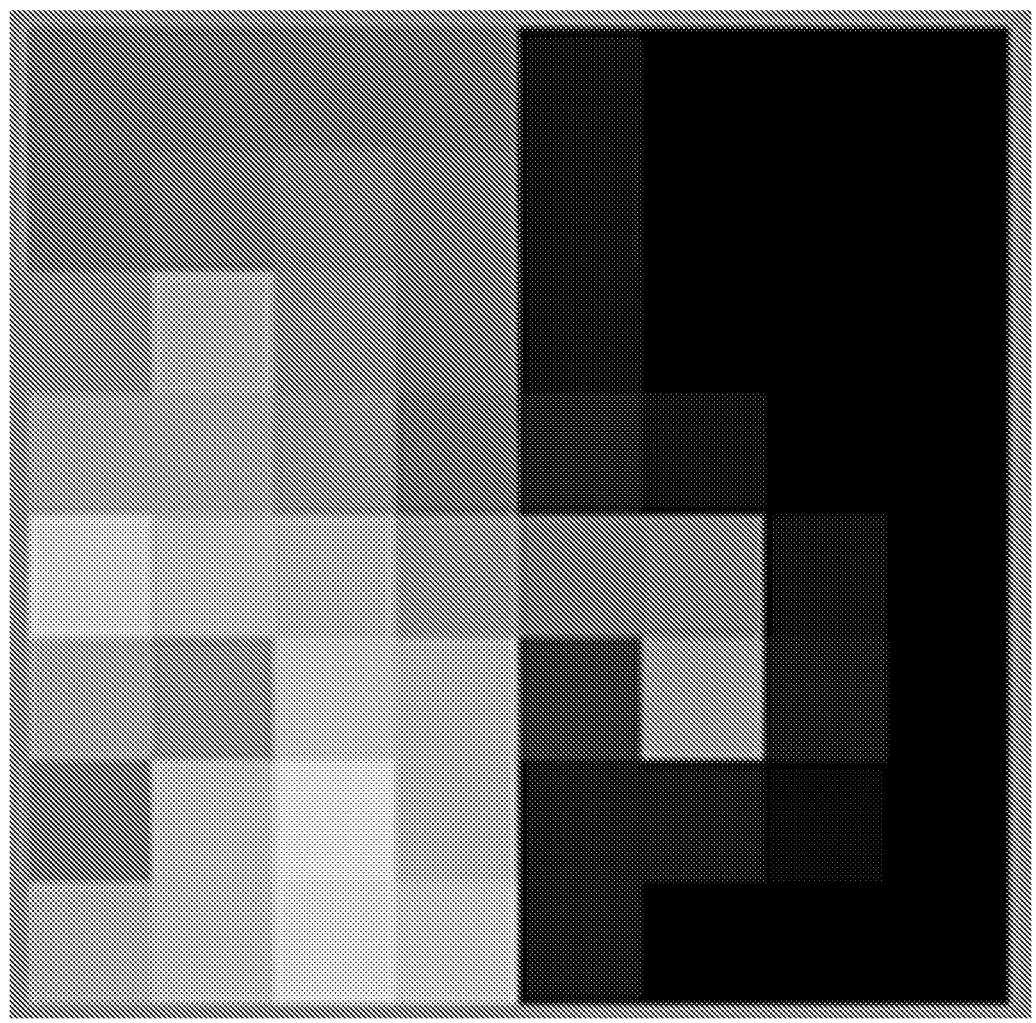
FIG. 9 illustrates an example of data after a resize operation has been performed.

The result of a resize operation having been performed on blur operation output 800 is shown in FIG. 9—a locus that is a 64 byte image. Image 900 is provided to hashing engine 216 (which can be implemented as a Java program, a set of one or more python scripts, etc.) which further reduces the representation of sample 202 while preserving some of its entropy. In particular, in some embodiments, hashing engine 216 performs a locality-sensitive hashing (LSH) operation on the locus. As one example, the 64 byte image can be reduced to a 63 bit representation by performing a "less than" comparison using locality sensitive hashing. In particular, byte zero is compared to byte one of image 900. If byte zero is less than byte one, the comparison is "true" and the result is a "1." If byte zero is not less than byte one, the comparison is "false" and the result is a "0." Next, byte one is compared to byte two; byte two is compared to byte three; and so on, until the end of the image is reached. An example of the output of hashing engine 216 that could be generated for image 900 (i.e., using a "less than" in a locality sensitive hashing operation) is: "100010000100010000010110111110100101100011 0001010100100000000000." Other operators (or combinations of operators) can also be used in conjunction with the LSH, as applicable (e.g., greater than, removing every n bits, etc.).

In some embodiments, the binary output of hashing engine 216 is in turn provided to cluster identifier generator 218 which converts the result of hashing engine 216 into a hexadecimal string and optionally prefixes it with additional information (i.e., making the identifier more convenient for human use). As one example, the result of hashing image 900 is converted by cluster identifier generator 218 to "884416fa58c5484c." Cluster identifier generator 218 can further refine the output to include additional information, such as the Hilbert order and/or a file format associated with the sample. As one example, the Hilbert order can be prepended as a 16 byte hexadecimal value, meaning that every sample that fits in a particular size Hilbert order has its own namespace. As another example, an indicator of the file format can instead/in addition be prepended as a character. Using "884416fa58c5484c," an example of a refined output of cluster identifier generator 218 is "h09.884416fa58c5484c", where "h" indicates the Microsoft Portable Executable (PE) format namespace, 09 is the Hilbert order, and "." is a separator. In some embodiments, cluster identifier generator 218's processing is omitted, and/or is combined with the processing performed by hashing engine 216. In some embodiments, the processing performed by hashing engine 216 is omitted. Use of a locally sensitive hashing function on a locus reduces the name space that clusters occupy (e.g., in a database). Such optimization may not be necessary in various scenarios and the hashing can be omitted (or considered optional). As one example, internal accounting can be accomplished using a locus, but when displaying human readable code (e.g., in a report or web page) the locus can be substituted with a shorter identifier (e.g., a hash of the locus).

Cluster identifier generator 218 provides the output of its operation (e.g., "h09.884416fa58c5484c") to label engine 220. Label engine 220 is configured to insert the MD5 of sample 202 into repository 206 using the identifier generated by cluster identifier generator 218. Specifically, in some embodiments, label engine 220 executes an "add to set" (hash set) command, adding the MD5 of sample 202 to the set identified by the key "h09.884416fa58c5484c." In the event identifier "h09.884416fa58c5484c" is not already present in repository 206, the identifier will be inserted with the "add to set" operation (and the MD5 of sample 202 included). Additional processing can also be performed. For example, since the sample does not correspond to any existing samples stored in repository 206, the sample can be provided to sandbox service 106 for analysis. In some embodiments, in the event sandbox service 106 already has information about the sample (ascertainable, e.g., by platform 102 sending the MD5 hash value of the sample to sandbox service 106 before sending the sample itself), the sample is not transmitted by platform 102 to 106. Results provided by sandbox service 106 (e.g., a listing of observed malicious behaviors) can be stored in repository 206 as metadata associated with the "h09.884416fa58c5484c" family of malware. It is to be noted that hashing a locus into a cluster identifier can be optionally performed (e.g., to aid humans who will tend to prefer copying/typing smaller shorter strings). An un-hashed locus can also be used as an alternate way of identifying/managing clusters of data (e.g., where the use of 64 byte strings, 256 byte strings, etc. are also acceptable).

As another example, a copy of the sample (and/or its MD5 hash value) can be sent to scan service 108, which will return information about which (if any) of the scanning engines employed by scan service 108 detect the sample as malicious, and any names given to the sample by such engines. In some embodiments, platform 102 is configured to store (e.g., as metadata), as a human-readable name for the "h09.884416fa58c5484c" identifier, the result of performing a greatest common subsequence on any names received by scan service 108. Other approaches can also be used to select/store human-readable names for samples/clusters of samples, as applicable, such as preferentially using the name provided by one engine over another, concatenating multiple names together (e.g., where different engines use different names), etc.

If the identifier "h09.884416fa58c5484c" is already present in repository 206, this means other samples, having different MD5 hash values (but otherwise very similar to sample 202), were previously examined by platform 102 (i.e., part of a cluster of very similar samples). As one example, suppose a malicious developer changes a single pixel of an image included in a sample each time he attacks a victim. An MD5 hash value of the sample with the changed pixel will look vastly different from an MD5 hash value of the sample without the changed pixel, even though the samples are otherwise identical. As will be described in more detail below, such subtle changes will not impact the identifier ultimately generated by cluster identifier generator 218 and so both samples (with and without the changed pixel) will both be considered members of the same cluster of malware (e.g., the "h09.884416fa58c5484c" cluster). If a member of the "h09.884416fa58c5484c" cluster has already been analyzed, then resources can be conserved (e.g., by not sending the changed pixel sample to sandbox service 106, and instead only sending to sandbox service 106 those samples having an associated cluster identifier that was not previously seen). In some embodiments, the sample (or an MD5 hash of the sample, as applicable) is always sent to at least one of sandbox service 106 and/or scan service 108 (e.g., to augment information already present about the family stored in repository 206). In other embodiments, a subset of samples is sent to services 106/108. As one example, the first time a sample is received for a cluster identifier (i.e., a sample having a new cluster identifier is received), the sample can be sent to services 106/108 for analysis. As additional samples having that cluster identifier are received by platform 102, various customizable rules can be used to determine which samples should be processed. One example scenario is to send the first n samples for processing (e.g., the first ten samples for a given cluster identifier), then statistically select additional samples for processing as they arrive (e.g., send 25% of samples 11-200, then send 5% of any additional samples). Information received back from services 106/108 can be used to refine which future samples are sent for processing for a given cluster identifier. For example, if all initially sent samples are confirmed as "known good" by services 106/108, in various embodiments, platform 102 can cease sending later received samples sharing the same cluster identifier. Similarly, if services 106/108 consistently return results indicating that samples sharing a particular cluster identifier are "known malicious" with a high degree of certainty, platform 102 can reduce the number of samples sent to services 106/108 having that cluster identifier as new samples are received. Where services 106/108 are not confident in their results, platform 102 can continue to send a higher number of samples for analysis as they arrive, potentially eventually resulting in a more confident answer from services 106/108 over time.

Example Process

Figure 10:
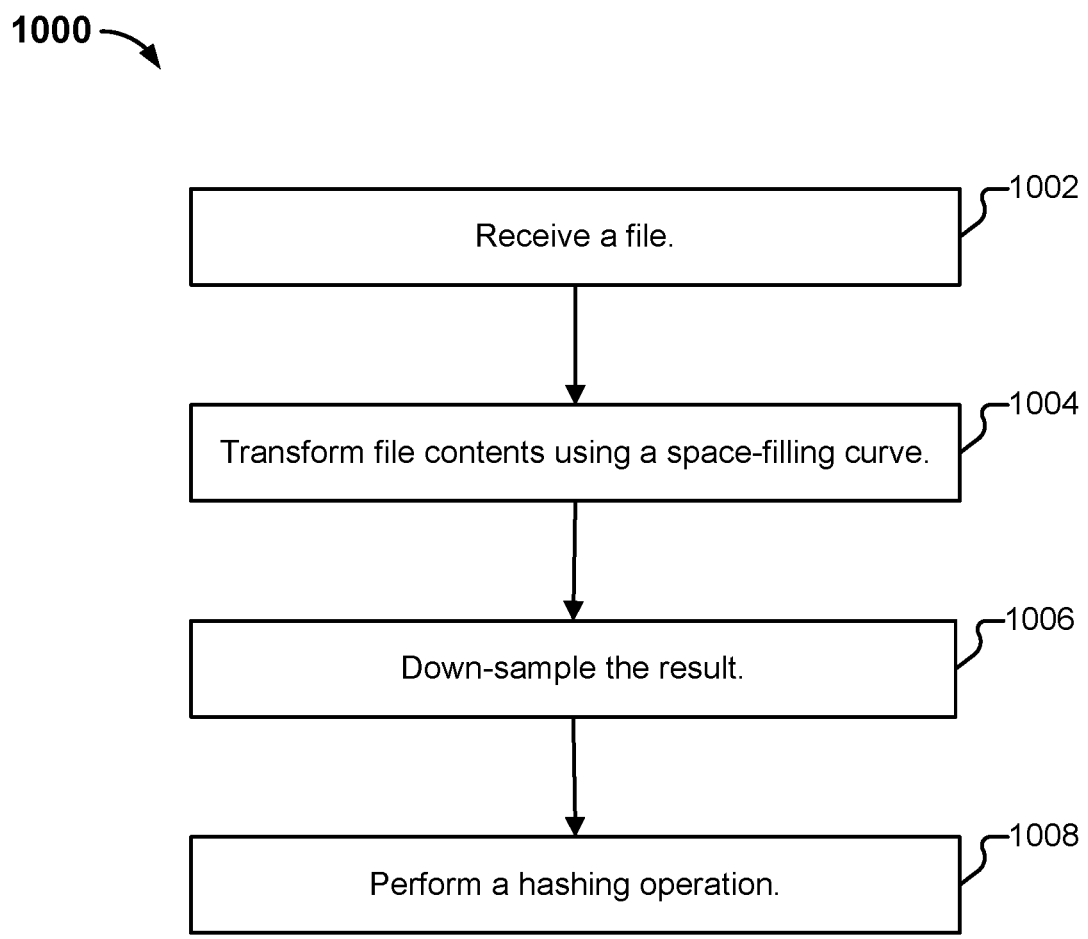
FIG. 10 illustrates an embodiment of a process for analyzing data.

FIG. 10 illustrates an embodiment of a process for analyzing data. In various embodiments, process 1000 is performed by platform 102. The process begins at 1002 when a file is received. As one example, a file is received at 1002 when sample 202 is received by platform 102 (e.g., via an embodiment of interface 204). At 1004, file contents are transformed using a space-filling curve (e.g., by transformation engine 212). As explained above, additional processing can be performed after receipt of a file and prior to the transformation occurring. For example, preprocessor 210 can perform preprocessing on sample 202, resulting in a first array of bytes. Also, decisions such as what order Hilbert curve to use, and what down-sample size should be used can be made. At 1606, the result of the space-filling curve transformation is down-sampled. As one example, down-sampling can be performed by down-sample engine 214 which is configured to perform a blur operation (with anti-aliasing) and resize operation on the result of the space-filling curve transformation. Finally, at 1608, a hashing operation is performed. As one example, at 1608, hashing engine 216 performs an LSH hashing operation on the down-sampled result. As explained above, additional processing can also be performed in conjunction with process 1000, such as sending the sample to services such as 106 and 108, and associating the sample with the result of the LSH hash (or a representation thereof) in a repository. The locus can also be used (e.g., instead of/in addition to the LSH hash as a cluster identifier), for example, in namespaces with many neighbors.

Reporting

The contents of repository 206, and in particular recently updated portions thereof, can be provided to entities such as companies 110-114, services 106-108, and/or any other appropriate entities in a variety of ways. As one example, platform 102 can be configured to make available an API that such entities can use to conduct queries (and retrieve results). As another example, platform 102 can make available a daily digest (e.g., packaged as a tar.gz) of newly seen samples and associated information. As one example, suppose a few hundred thousand new samples are received and processed by platform 102 each day. The corresponding digest of results and samples, made available to customers, could comprise approximately 10G of data.

An example of a daily cluster report is depicted in FIG. 11. The daily cluster report summarizes the new samples that have been collected by platform 102 since midnight (i.e., samples not previously analyzed by platform 102). The first column (1102) lists cluster identifiers. The second column (1104) represents a probability that a member of the given cluster (i.e., a unique sample having a unique MD5 hash value from the other members) will successfully pass through an engine in VirusTotal unreported. The third column (1106) is a count of the new members added to the cluster since midnight. Finally, the last column (1108) is a label assigned to the cluster. Using the first row of the report (1110) as an example, the probability that a sample in the o3f9.1a9f2049c0000b16 cluster will successfully pass through an engine in VirusTotal is 0.55725956. The label assigned to cluster o3f9.1a9f2049c0000b16 is "kovter pemalform riskware." Finally, since midnight (on April 26), 377 unique new samples, all members of cluster o3f9.1a9f2049c0000b16, were seen by platform 102 (which may already have had a potentially large number of members). An example of how different samples (having different MD5 hash values) will be clustered together follows.

For some of the clusters (e.g., cluster 1112 which has a cluster identifier of "o3e7.11935895c2210b12"), platform 102 does not have a probability in column 1104, and does not have any labels (but has seen 120 new samples since yesterday). One reason this could be the case is that all of the member(s) of the cluster are new, and have not yet been submitted to (and/or processed by) service 108. Another reason this could be the case is that all engines in service 108 have determined that the sample is not malicious. As will be described in more detail below, in various embodiments, platform 102 determines one or more clusters that are similar to cluster 1112 (e.g., for which it does have information), and uses information about the similar cluster(s) to help gain insight about cluster 1112 (e.g., by inheriting probability scores, labels, maliciousness verdicts, etc).

Figure 12:
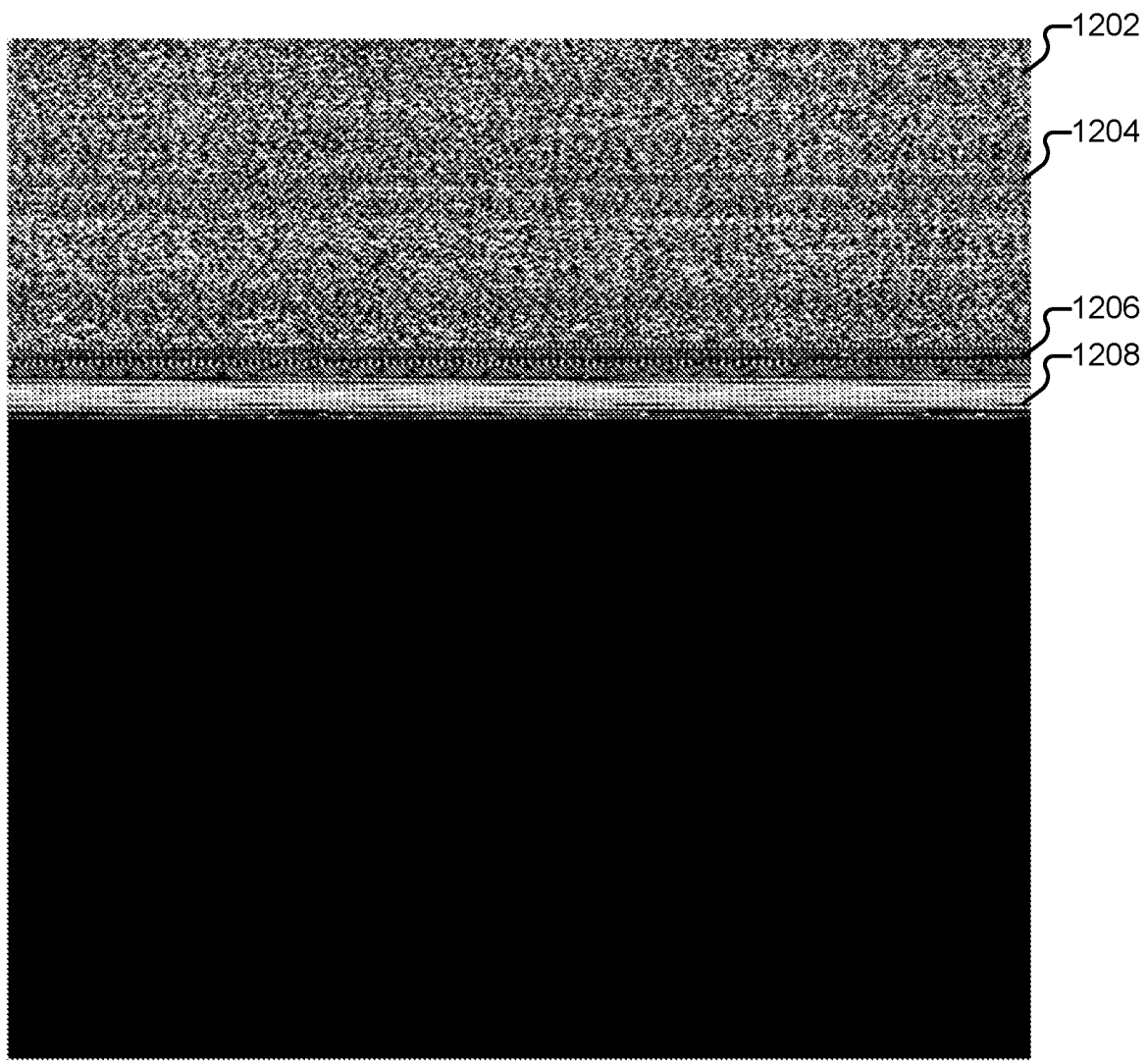
FIG. 12 illustrates a graphical representation of a bytestream.
Figure 13:
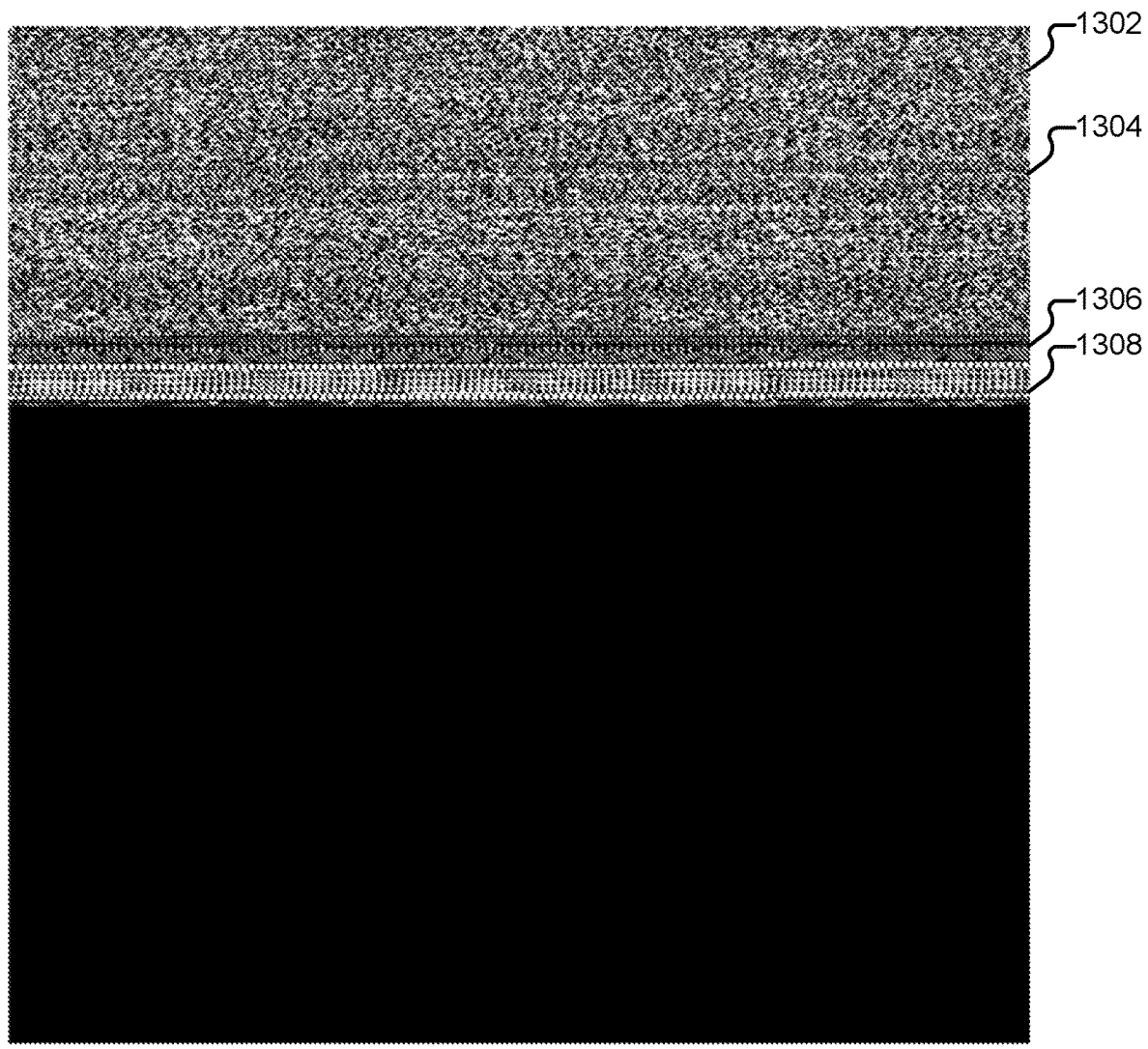
FIG. 13 illustrates a graphical representation of a bytestream.

FIGS. 12 and 13 depict graphical representations of bytestreams associated with two respective samples (similar to the representation shown in FIG. 3). In particular, FIGS. 12 and 13 correspond to samples that have MD5 hash values of "c6cda9e3d865c33afb4a08ff6ea53459" and "fcd40892da915d5edbf76e5c94265c11," respectively. The two samples were authored by the same nefarious individual and perform similar malicious actions (e.g., installing a keystroke logger). The nefarious individual attempted to conceal that the samples are in essence the same, by making slight differences to the second sample.

Regions 1202 and 1302 of the respective bytestream representations comprise ".text" data. Regions 1204 and 1304 of the respective bytestream representations comprise ".data" data. Regions 1206 and 1306 of the respective bytestream representations comprise ".idata" data. Regions 1208 and 1308 of the respective bytestream representations comprise ".rsrc" data. The remainder of the bytestream representations correspond to empty space.

Figure 14:
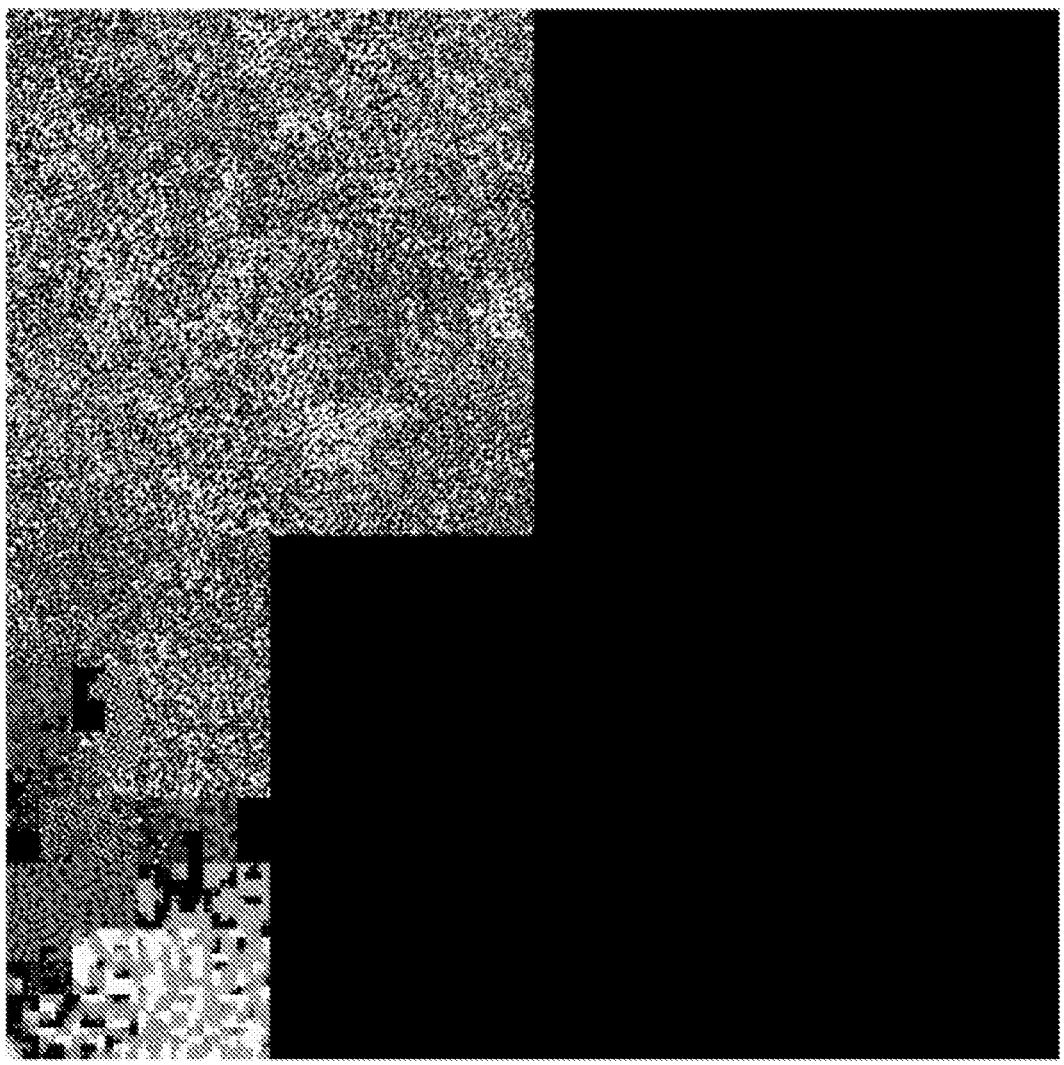
FIG. 14 illustrates a graphical representation of a result of a Hilbert curve mapping operation.
Figure 15:
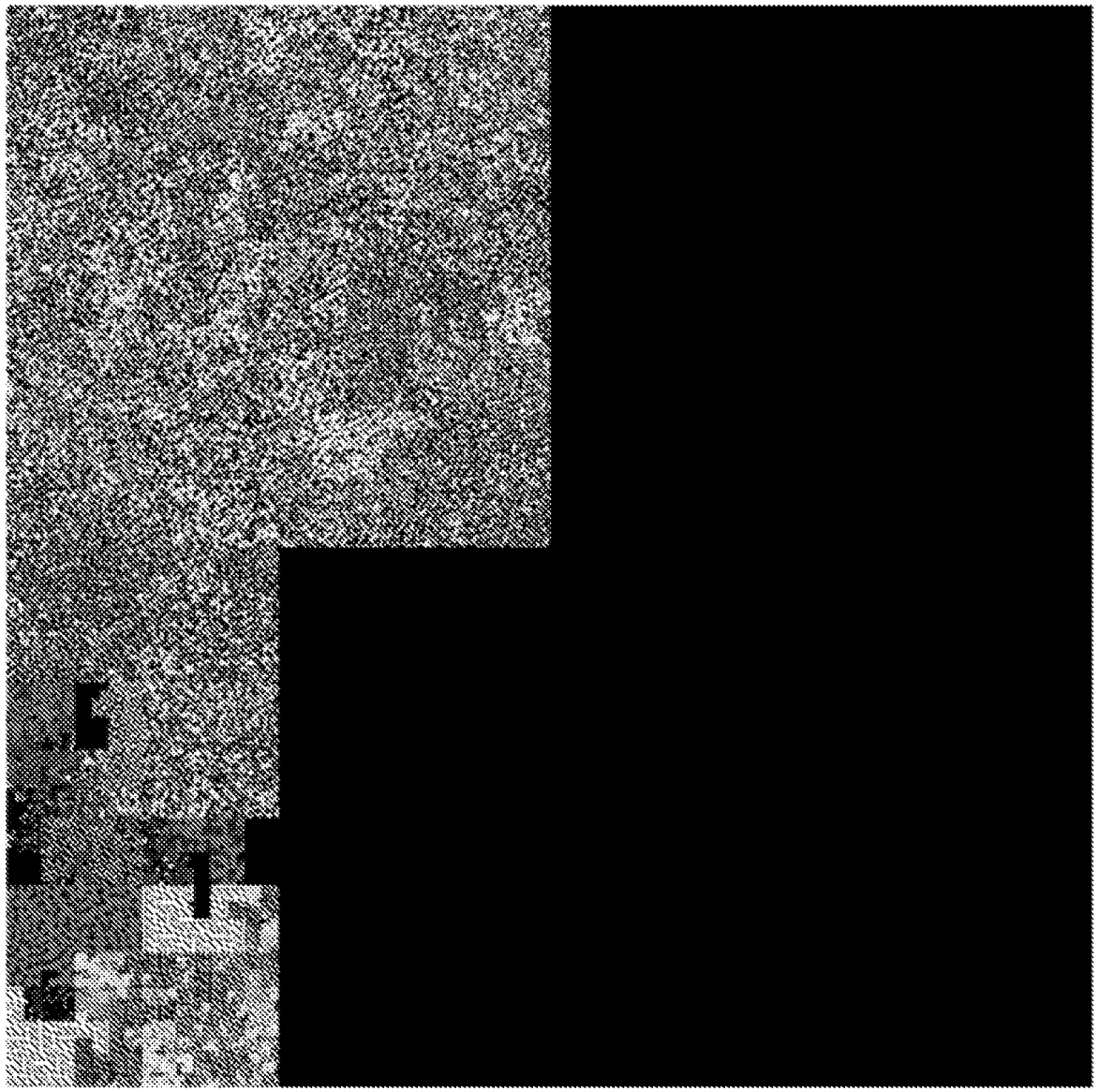
FIG. 15 illustrates a graphical representation of a result of a Hilbert curve mapping operation.
Figure 16B:
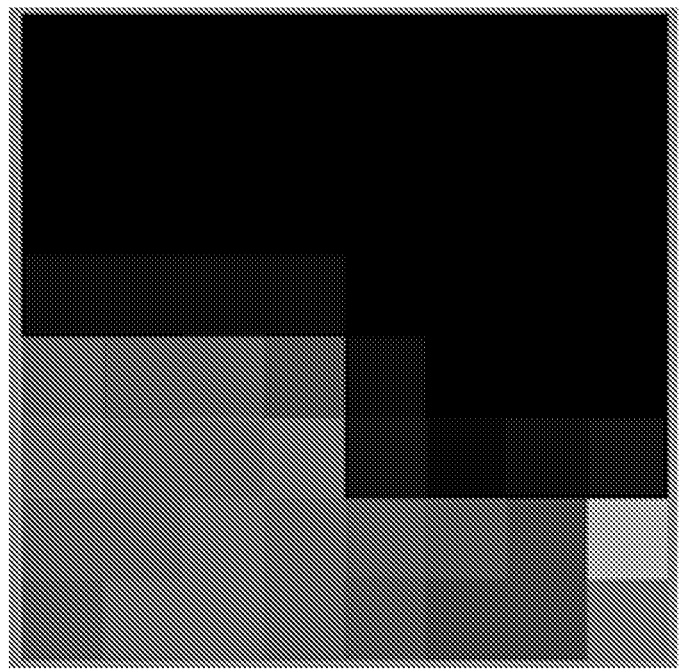
FIG. 16B illustrates pixel data.
Figure 16A:
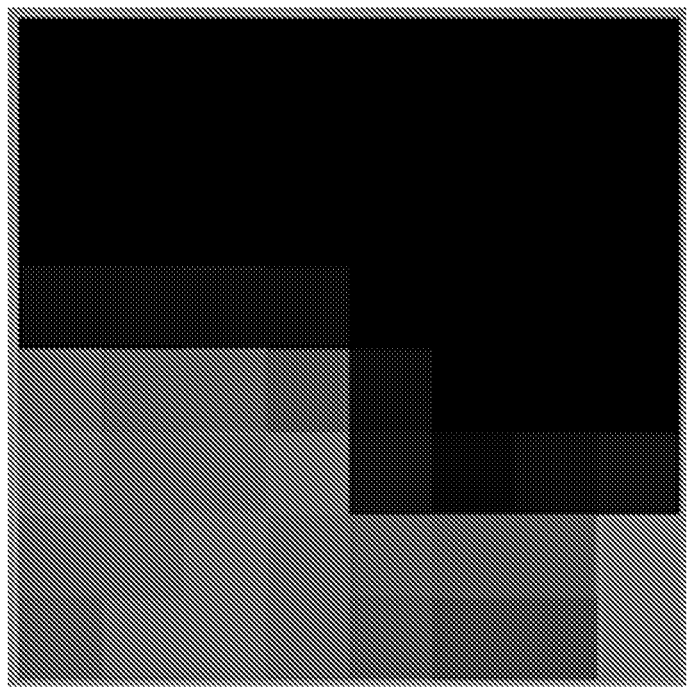
FIG. 16A illustrates pixel data.

FIGS. 14 and 15 depict graphical representations of bytestreams after a Hilbert curve mapping has been applied (e.g., by transformation engine 212) to the data shown in FIGS. 12 and 13, respectively. Samples "c6cda9e3d865c33afb4a08ff6ea53459" and "fcd40892da915d5edbf76e5c94265c11" have very different MD5 hash values, and have very similar but not identical pixel data (as seen in FIGS. 16A and 16B). However, when hashing engine 216 performs a locality-sensitive hashing operation (e.g., using "less than") on 1602 and 1604 respectively, identical output will be obtained: "110001001101000010011001000101010100001100000000 01000100000000000." Cluster identifier generator 218 will therefore convert the result of hashing engine 216 into identical strings for both samples: "h09.c4d099154300880c." Accordingly, both samples will be added to the same cluster, "h09.c4d099154300880c," within repository 206, despite the very different MD5 hashes of the two samples.

FIG. 17 depicts an example of a cluster detail report. One way to arrive at the report depicted in FIG. 17 is to click on a link such as link 1112 or 1114. An alternate way to arrive at the report depicted in FIG. 17 is to perform a search (e.g., using a search box, an API call, or other appropriate technique) using a cluster identifier (e.g., searching for "m3e9.611c96cf656cc6d2" (1702)). Other ways to arrive at the report depicted in FIG. 17 include interacting with a report about a particular sample, and interacting with a neighbor of the cluster, both of which are described in more detail below.

Region 1704 of the report indicates that a total of 788 of the samples analyzed by platform 102 share a cluster identifier of "m3e9.611c96cf656cc6d2." The MD5 hash value of each of the 788 samples is listed in column 1706. Clicking on a link in column 1710 opens the VirusTotal page associated with the corresponding sample.

FIG. 18 illustrates portions of two different sample reports, depicted side-by-side for comparison. The first report, appearing in region 1802, is an example of a report obtainable by clicking on region 1712 in report 1700 (on sample "0813715051cdd8dc91c9b5da66bb2966"). The second report, appearing in region 1804, is an example of a report obtainable by clicking on region 1714 in report 1700 (on sample "0d94aa2c8042ed79c794866575e69d7d"). As shown in regions 1806 and 1808, respectively, both samples have virtually identical Hilbert curve mapping representations (described above). As shown in regions 1810 and 1812, respectively, both samples are members of the cluster m3e9.611c96cf656cc6d2. The samples have different hash values, as shown in regions 1814 and 1816, 1818 and 1820, and 1822 and 1824, respectively. Additional information included in the reports include the time the sample was first observed by platform 102 (1826), a MIME type of the sample (1828), and a location of the sample in repository 206 (1832). Region 1830 depicts a traffic light protocol (TLP) designation (e.g., red, yellow, or green) that can be used to determine whether information about a given sample can be shared (e.g., with companies 110-114). Region 1834 indicates whether a YARA signature is available for the cluster (and if so, provides a link to the signature).

FIG. 19 illustrates portions of two different VirusTotal reports, depicted side-by-side for comparison. By clicking on the link in region 1840, a viewer of report 1802 will be taken to the VirusTotal page for sample 0813715051cdd8dc91c9b5da66bb2966. The SHA256 value is common across regions 1822 and 1906. Similarly, by clicking on the link in region 1842, a viewer of report 1804 will be taken to the VirusTotal page for sample 0d94aa2c8042ed79c794866575e69d7d. The SHA256 value is common across regions 1824 and 1908. Column 1910 of report 1902 shows a list of engines that were used to analyze the sample represented in report 1902. Column 1912 indicates a corresponding verdict provided by the engines. As indicated in region 1914, of the 61 engines that evaluated the sample, 56 of the engines considered it to be malicious. Similarly, as indicated in region 1916, of the 59 engines that evaluated the sample represented in report 1904, 56 considered it to be malicious. In various embodiments, detection ratio information, such as is shown in regions 1914 and 1916, is used by platform 102 to determine prediction information such as is shown in column 1104 of report 1100. One example way for platform 102 to determine a value for the column (e.g., "0.3766396" at 1116) is for platform 102 to subtract from 1 the average of all of the detection ratios for each sample in a cluster. Other approaches can also be used, such as by using only a subset of samples' detection ratios instead of all samples in a cluster.

Regarding column 1912, in various embodiments, the terms appearing in column 1912 are used by platform 102 to generate a label for a cluster (such as the label "kovter pemalform riskware" depicted in FIG. 11). As one example, a script (e.g., written in python) can collect all of the terms for all of the samples associated with a given cluster, remove stop words (e.g., "win32" and "worm"), remove symbols, and select as a label for the cluster, the three most common words.

Figure 20:
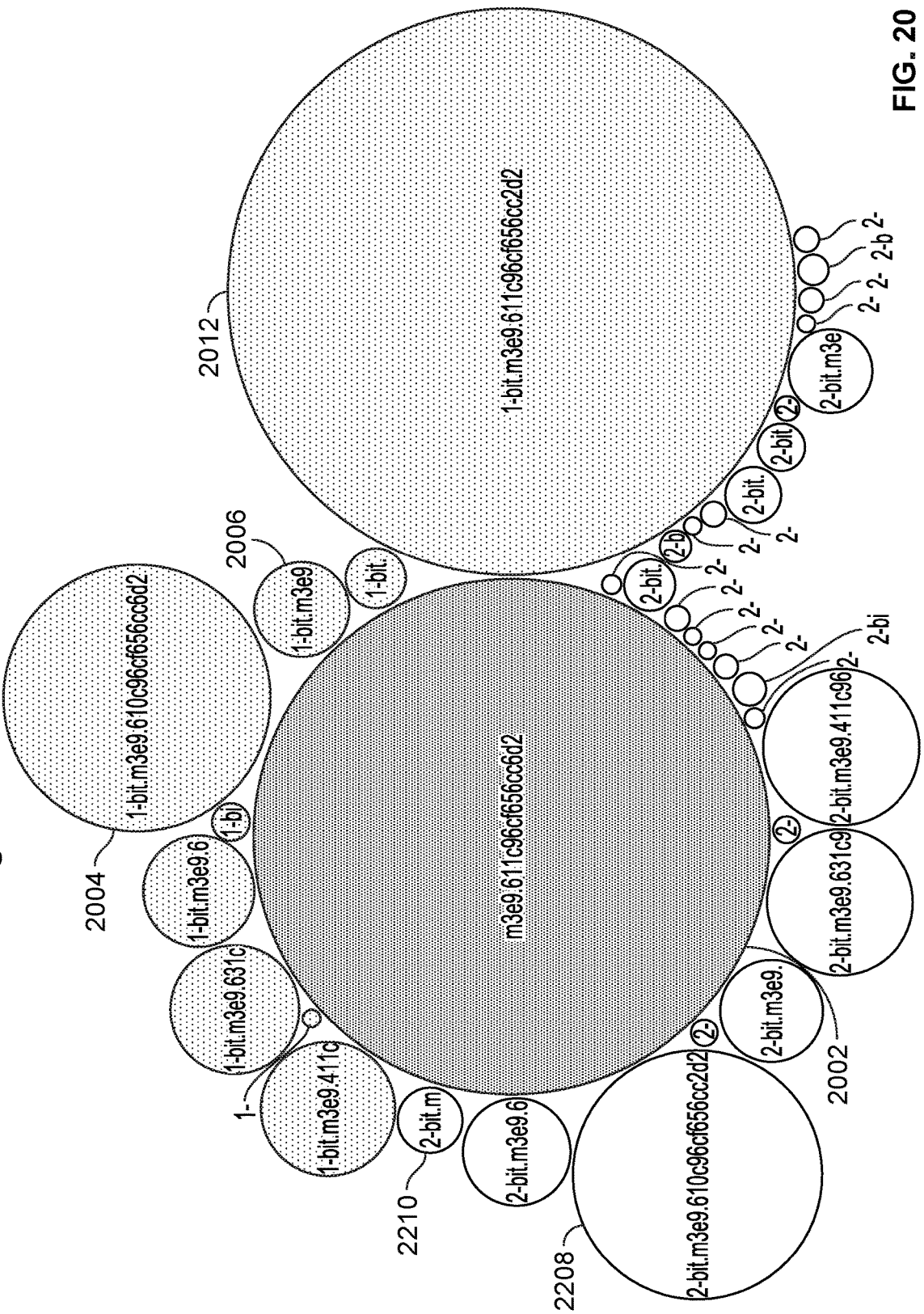
FIG. 20 illustrates information about cluster neighbors as rendered in an interface.

Returning to FIG. 17, in various embodiments, the "Cluster Neighbors" link (1716) leads to an interface such as is shown in FIG. 20 (e.g., rendered in a web browser). Information about cluster neighbors can also be provided by platform 102 in other ways, such as through a textual list, responses to API calls, etc. Cluster m3e9.611c96cf656cc6d2 is represented in region 2002. Also present in FIG. 20 are representations of various nearest neighbors of cluster m3e9.611c96cf656cc6d2 and their sizes (i.e. number of members) relative to cluster m3e9.611c96cf656cc6d2. Each of the clusters shown in FIG. 20 as having a cluster identifier prefix of "1-bit" (e.g., cluster 2004 and cluster 2006) represents a cluster that is an edit distance of one bit away from cluster m3e9.611c96cf656cc6d2. The cluster identifiers in FIG. 17 are variously depicted as truncated to ease in visual understanding. Each of the clusters shown in FIG. 20 as having a prefix of "2-bit" (e.g., cluster 2208 and 2210) represents a cluster that is an edit distance of two bits away from cluster m3e9.611c96cf656cc6d2. Using cluster 2012 as an example, cluster 2012 has a cluster identifier of "m3e9.611c96cf656cc2d2." There is a one bit difference between Cluster 2002 and 2012. Clusters 2002 and 2012 have approximately the same number of members.

FIG. 21 illustrates portions of two different sample reports, depicted side-by-side for comparison. Reports 2102 and 2104 pertain to samples "0f33bdbedea51ee73c3a5da111ad103c" and "02f4cc2e395abcb99d1a93efb3238a84" which are members of cluster m3e9.611c96cf656cc2d2 (depicted at 2012 in FIG. 20). As shown in regions 2106 and 2108, respectively, both samples have virtually identical Hilbert curve mapping representations (described above). Further, the images appearing in regions 2106 and 2108 are virtually to those in 1806 and 1808.

FIG. 22 illustrates portions of two different VirusTotal reports, depicted side-by-side for comparison. By clicking on the link in region 2110, a viewer of report 2102 will be taken to the VirusTotal page for sample 0f33bdbedea51ee73c3a5da111ad103c. The SHA256 value is common across regions 2114 and 2206. Similarly, by clicking on the link in region 2112, a viewer of report 2104 will be taken to the VirusTotal page for sample 02f4cc2e395abcb99d1a93efb3238a84. The SHA256 value is common across regions 2116 and 2208. Column 2210 of report 2202 shows a list of engines that were used to analyze the sample represented in report 2102. Column 2212 indicates a corresponding verdict provided by the engines. As indicated in region 2214, of the 56 engines that evaluated the sample, 53 of the engines considered it to be malicious. Similarly, as indicated in region 2216, of the 57 engines that evaluated the sample represented in report 2104, 52 considered it to be malicious. The idenfiers, "virut," and "allaple" appear frequently in each of columns 1912, 1918, 2212, 2218.

Using Clusters and Distance Relations

Suppose that benign software running on Alice's computer has recently performed an update, and as a result, a new executable file ("helperapp.exe") has been downloaded to her computer. Agent 154, running on Alice's computer, determines that helperapp.exe is new (i.e., not previously seen by agent 154), and consults platform 102 for more information. Agent 154 transmits the MD5 hash value of helperapp.exe to platform 102.

As previously discussed, if an MD5 hash of helperapp.exe is present in dataset(s) 222, a verdict (e.g., benign or malicious) can be provided to agent 154. An MD5 hash of helperapp.exe may also be present in repository 206 (e.g., due to process 1000 having been previously performed on a copy of the sample). Information about the cluster of which the executable is a member can be used to provide instructions back to agent 154. As one example, the cluster's VirusTotal probability (examples of which are shown in column 1104) can be used as a heuristic in determining whether members of the cluster are likely to benign or malicious.

Using helperapp.exe as an example, suppose a previous version of helperapp.exe (e.g. version 1.23) was analyzed by platform 102 and assigned as a member of a cluster (having a particular cluster identifier). And, suppose that the version of herlpapp.exe installed on Alice's computer (e.g., version 1.24) is newly seen by platform 102 (i.e., platform 102 does not have an MD5 hash value corresponding to helpapp.exe version 1.24 in repository 206). Further suppose that the only changes made to helperapp.exe v1.24 from helperapp.exe v1.23 are that the software developer of helperapp.exe updated help text, and changed copyright dates from 2016 to 2017. Alice's version of helperapp.exe (v. 1.24) will have a different MD5 hash value than the previously analyzed version (v. 1.23). However, and as explained above, the two versions of helperapp.exe will likely have virtually identical Hilbert curve mapping representations, and thus ultimately have identical/near identical cluster identifiers. The following is an example of a process that can be performed on helperapp.exe (v. 1.24) by platform 102 to provide information back to agent 154.

Figure 23:
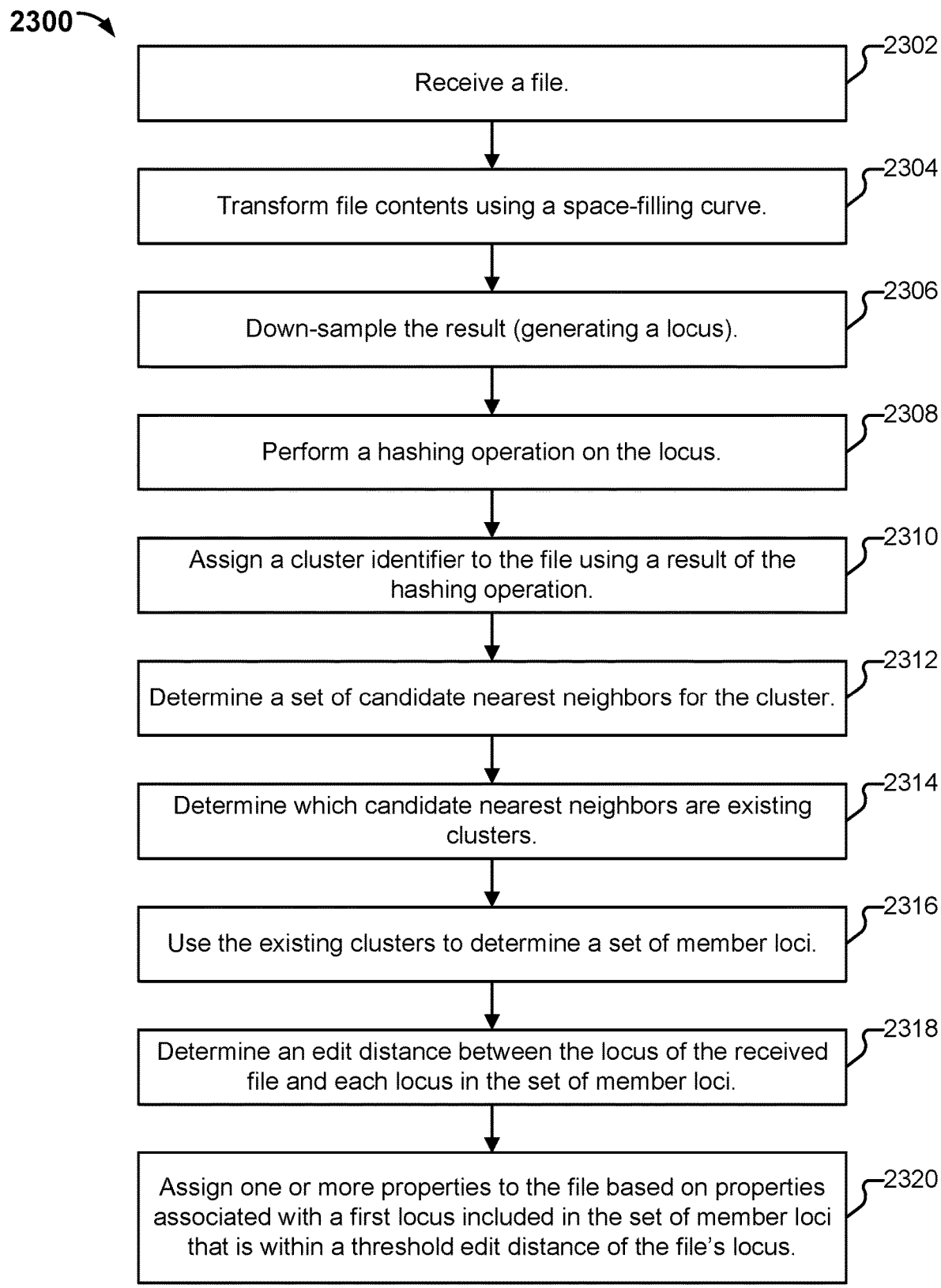
FIG. 23 illustrates an embodiment of a process for assigning properties to a file.

FIG. 23 illustrates an embodiment of a process for assigning properties to a file. Process 2300 is an example of processing that can be performed by platform 102 where (e.g., with helperapp.exe (v. 1.24)), platform 102 receives a file for which it does not already have information (e.g., in dataset 222 or repository 206).

The process begins at 2302 when a file is received. As one example, a file is received at 2302 when helperapp.exe (v. 1.24) is received by platform 102 (e.g., via an embodiment of interface 204). At 2304, file contents are transformed using a space-filling curve (e.g., by transformation engine 212). As explained above, additional processing can be performed after receipt of a file and prior to the transformation occurring. For example, preprocessor 210 can perform preprocessing on sample 202, resulting in a first array of bytes. Also, decisions such as what order Hilbert curve to use, and which down-sample size should be used can be made. At 2306, the result of the space-filling curve transformation is down-sampled (resulting in a locus). As one example, down-sampling can be performed by down-sample engine 214 which is configured to perform a blur operation (with anti-aliasing) and resize operation on the result of the space-filling curve transformation. At 2308, a hashing operation is performed. As one example, at 2308, hashing engine 216 performs an LSH hashing operation on the locus (the down-sampled result). As explained above, additional processing can also be performed in conjunction with process 2300 or portions thereof, such as sending the sample to services such as 106 and 108, and associating the sample with the result of the LSH hash (or a representation thereof) in a repository.

At 2310, a cluster identifier is assigned to the sample using a result of the hashing operation. As one example, at 2310, cluster identifier generator 218 converts the result of the LSH hashing operation performed by hashing engine 216 into a hexadecimal string and prefixes it with additional information. As previously explained, an example of such a cluster identifier is "h09.884416fa58c5484c," where "h" indicates the Microsoft Portable Executable (PE) format namespace, 09 is the Hilbert order, "." is a separator, and "884416fa58c5484c" is the hexadecimal conversion of a hash.

As previously explained, in some cases, the cluster identifier assigned for the sample may already be present in repository 206. If so, the sample can be added to the existing cluster as an additional member. Information associated with the cluster, such as a maliciousness verdict, can be provided (e.g., to agent 154) as applicable. Suppose, however, the cluster identifier assigned to the sample at 2310 is not present in repository 206. The sample may be an entirely new piece of software, or may also be similar to samples previously seen by platform 102. The following portions of process 2300 can be used to identify whether the sample is similar to samples already present in repository 206, and if so, to assign properties to the sample using properties of similar samples.

At 2312, a set of candidate nearest neighbors is determined for the sample's cluster (i.e., that was determined at 2310) and at 2314, a determination is made as to which of the candidate nearest neighbors correspond (if any) to existing clusters within platform 102 (e.g., has a record in repository 206).

As one example of the processing performed at 2312/2314, candidate finder 224 uses the sample's cluster identifier to generate a set of candidate identifiers. In various embodiments, candidate finder 224 comprises a set of one or more scripts written in an appropriate scripting language, such as python of Java. Using the binary representation of the cluster identifier for illustrative purposes, a sample identifier of "1000100001000100000101101111101001 01100011000101010010000000000" can be used to generate a set of 63 candidate identifiers where each candidate identifier has one bit flipped from the sample's cluster identifier (i.e., is one bit of edit distance away from the sample's cluster identifier). Using the first few bits of the sample's cluster identifier as an example, "10001 . . . " is used to generate candidate identifiers that begin "00001 . . . ," "11001 . . . ," "10101 . . . ," "10011 . . . ," "10000 . . . ," etc.). In various embodiments, second order candidate identifiers are also generated, where any two given bits in the sample's cluster identifier are flipped (i.e., is two bits of edit distance away from the sample's cluster identifier, and resulting in a set of $64^2$ candidate identifiers). Third order candidate identifiers (and beyond) can also be generated, where any three given bits in the sample's cluster identifier are flipped (resulting in a set of $64^3$ candidate identifiers). In various embodiments, third (and/or higher) order candidate identifiers are only generated in the event no matches are found (e.g. at 2314) for lower order candidate identifiers. Locuses can be used in a similar fashion (resulting in a longer name space and thus more calculations) with similar results. For example, a locus could be 64 bytes (512 bits) and neighbors would be any bit string with an edit distance of one or two bits.

Candidate finder 224 uses the set of candidate identifiers generated at 2312 as a search list and queries against information stored in repository 206. Suppose in this example that a set of candidate nearest neighbor identifiers is generated using one-bit and two-bit edit distances (i.e., a set of approximately 4096 candidate identifiers is generated). Further suppose that when candidate finder 224 queries repository 206 using those 4096 candidates as keys, three results are returned (i.e., there are three hits when performing a hash table lookup using the identifiers generated at 2312). This indicates that three clusters (having corresponding cluster identifiers included among the search list of candidate identifiers) have previously been observed/processed by platform 102 and are nearest neighbors (within one or two bits of edit distance) to the cluster identifier of the sample (i.e., that was determined at 2310).

At 2316, a set of member loci is assembled using the loci of each of the members of the respective cluster identifiers determined at 2314. And, at 2318, an edit distance between the locus of the sample and each of the loci in the set of member loci is determined. One example of processing performed at 2316/2318 is as follows. For each cluster identifier determined at 2314, collect a list of member samples for that cluster (an example of such a list is shown in column 1706 of FIG. 17). For each member sample in the list, retrieve (or, as needed, determine) the locus for that member sample. Then, determine an edit distance (e.g., Levenshtein distance) between the sample's locus, and each member locus. A threshold edit distance (e.g., an edit distance of four bits) can be used to determine whether the sample's locus and a member locus are sufficiently close to one another. If the edit distance is under the threshold, at 2320, one or more properties is assigned to the sample, as described in more detail below.

Suppose that for the three cluster identifiers obtained at 2314, the first cluster has 100 members, the second cluster has 400 members, and the third cluster has 250 members. Further suppose that, of the 100 members of the first cluster, no member loci is within an edit distance of four bits from the sample's locus. Of the 400 members of the second cluster, suppose that 20 member loci are within an edit distance of one bit from the sample's locus, 50 members are within an edit distance of two bits from the sample's locus, and 120 members are within an edit distance of three bits from the sample's locus. Finally, suppose that of the 250 members of the third cluster, 15 member loci are within an edit distance of two bits from the sample's locus, 18 member loci are within an edit distance of three bits from the sample's locus (and no member loci are within an edit distance of one bit from the sample's locus). A variety of approaches can be used to assign properties at 2320. As one example, as both the second cluster and the third cluster include member loci having an edit distance within a threshold of the sample's locus (i.e., within four bits), properties of both the second and third cluster can be inherited by the cluster identifier determined at 2310 (and thus associated with the sample). Thus, if the second and third clusters have verdicts of "not malicious," the cluster identifier determined at 2310 can also be assigned a verdict of not malicious (and the sample received at 2302 accordingly also treated as not malicious). Other properties such as labels can also be assigned at 2320 (e.g., by using the labels of the second cluster and the labels of the third cluster as labels for the cluster identifier determined at 2310). As an alternate example, where multiple clusters have member loci within the threshold edit distance of the sample, in various embodiments, only the closest cluster's information is used at 2320. In this example, since only the second cluster has member loci within an edit distance of one of the sample's locus, in some embodiments, only the properties of the second cluster are used at 2320. In other embodiments, other schemes can be used to determine which member loci (and/or the respective clusters of which they are members) should be used to assign properties at 2320. As one example, each member locus that is within a threshold edit distance of the sample locus can "vote" for its cluster's properties, weighted by the edit distance that the member locus is from the sample locus.

As previously mentioned, in some cases, no existing clusters (e.g., within one or two bits of edit distance) may be located at 2314, and/or at 2318, no member loci may be sufficiently close to the sample's locus (e.g., within one or two bits of edit distance). In some embodiments, in such scenarios, portions 2312-2320 of process 2300 are repeated, using a relaxed edit distance (e.g., an edit distance of 3 for either/both of portions 2312 and 2320). In various embodiments, if no loci within a threshold edit distance of the sample is found, no properties will be assigned to the file. Additional processing can be triggered by such a situation, such as by causing the sample to be transmitted to services 106/108 for further evaluation, generating an alert, etc.

Returning to the example of Alice, agent 154 is awaiting a verdict on whether helperapp.exe is malicious. As platform 102 has not previously encountered Alice's copy of helperapp.exe, providing a result after thorough analysis (e.g., subjecting the sample to analysis by services 106 and 108 and awaiting results) may be time consuming—likely too time consuming to be acceptable to Alice. Using the techniques described herein, platform 102 can provide a verdict back to agent 154 (e.g., malicious or not) by leveraging information previously ascertained from previously seen samples (that are sufficiently similar to the sample submitted by Alice). In particular, by employing an embodiment of process 2300, platform 102 can determine that helperapp.exe is either a member of an existing cluster (previously determined to be benign) or is a member of a new cluster that is sufficiently close to an existing cluster that it should inherit the properties of the existing cluster.

Additional Example: oem-drv64.sys

The file, oem-drv64.sys, is a piece of software that allows causes an installation of Microsoft WindowsNT or Windows 7 to appear to be legitimately licensed, when in fact the installation is not. The software includes two encrypted sections and copies of oem-drv64.sys often have different MD5s. As a result, suppose a total of 15,000 samples of oem-drv64.sys have been submitted to services 106/108 for analysis. The file is not malicious (and, services 106/108 have consistently returned verdicts of "not malicious" accordingly).

Using techniques described herein, various samples of oem-drv64.sys are assigned cluster identifiers of (for example): h08.928d8f3679816008, h08.960d8f3679816008, and h08.96898f3679816008, which are nearby one another using edit distance. Suppose a new sample of oem-drv64.sys (whose cluster identifier is not already present on platform 102) is provided to platform 102. Information such as the size of the nearest cluster neighbors, and the verdict information, can be used to rapidly provide a verdict on the newly received copy of oem-drv64.sys.

Additional Example: False Positive

Suppose a sample is received (e.g., at 2302) which has an MD5 value of 695aef60f6439d896ec2c8547482caf2 and is clustered (e.g., at 2310) to h10.86be1a430300c028. The software is not malicious, but has two false positive reports (e.g., as determined by services 106/108) and fifty five negative reports. A search of nearby clusters (e.g., at 2314) locates h10.86be1a430300c048 with four member hashes (2316). The locus of 695aef60f6439d896ec2c8547482caf2 is retrieved and compared to the locus of the samples in h10.86be1a430300c048 (e.g., at 2318). Suppose the four samples are each within one bit of the locus of the query sample, which is within an edit distance threshold for closeness. The four samples have MD5s, respectively, of b0fcd15501d36c9f6d6f32bcd1cd9a52, d24080d3474c38ba9c7de1715423a4e2, 8f3298572314d9a7a99472253208939b, and 8b47c1be17c139d111d1cffe5e8c1f50. Each of the four samples belongs to an open source software package and is not malicious. When platform 102 is consulted regarding the sample, the properties of the cluster (e.g., verdict good) can be inherited, and the false positives from 106/108 ignored accordingly.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    an interface configured to receive a file;
    a processor configured to:
        transform file contents using a space-filling curve;
        down-sample the transformed file contents to generate a sample locus;
        perform a hashing operation on the sample locus and assign a cluster identifier to the file based at least in part on a result of the hashing operation;
        in response to a determination that the cluster identifier is not present in a data store, determine a set of candidate nearest neighbors for the cluster identifier;
        for each candidate nearest neighbor included in the set of candidate nearest neighbors, determine a set of existing cluster identifiers present in the data store;
        for each existing cluster identifier included in the set of existing cluster identifiers, determine a set of member loci;
        determine an edit distance between the sample locus and each of the respective loci in the set of member loci; and
        in response to a determination that at least a first locus included the set of member loci is within a threshold edit distance of the sample locus, assign one or more properties to the file based at least in part on properties associated with first locus, wherein at least one property assigned to the file is an indicator of maliciousness; and
    a memory coupled to the processor and configured to provide the processor with instructions.

2. The system of claim 1 wherein, in response to associating an indicator of maliciousness with the file, the processor is further configured to transmit a verdict that the file is malicious.

3. The system of claim 2 wherein the processor is configured to transmit the verdict to a device from which the file was received by the interface.

4. The system of claim 1 wherein the processor is further configured to transmit an indication of at least one of the properties associated with the file to a device from which the file was received by the interface.

5. The system of claim 1 wherein associating the one or more properties to the file includes assigning one or more properties to the cluster identifier.

6. The system of claim 5 wherein at least one of the one or more properties comprises a label, and wherein the label is generated by selecting one or more words from a set of candidate words provided by a plurality of engines.

7. The system of claim 1 wherein the cluster identifier is assigned to the file based at least in part on a locality-sensitive hashing operation.

8. The system of claim 1 wherein the space-filling curve comprises a Hilbert curve.

9. The system of claim 8 wherein the processor is further configured to select a size for the Hilbert curve based at least in part on a size of the received file.

10. The system of claim 8 wherein the processor is further configured to select a size for the Hilbert curve based at least in part on a determination of a threshold amount of negative space to be included in the curve.

11. The system of claim 1 wherein down-sampling the transformed file includes performing a blur operation.

12. The system of claim 1 wherein down-sampling the transformed file includes performing an anti-aliasing operation.

13. The system of claim 1 wherein down-sampling the transformed file includes performing a resize operation.

14. The method of claim 1 wherein the space-filling curve comprises a Hilbert curve.

15. The method of claim 14 further comprising selecting a size for the Hilbert curve based at least in part on a size of the received file.

16. The method of claim 14 further comprising selecting a size for the Hilbert curve based at least in part on a determination of a threshold amount of negative space to be included in the curve.

17. A method, comprising:
    receiving a file;
    transforming file contents using a space-filling curve;
    down-sampling the transformed file contents to generate a sample locus;
    performing a hashing operation on the sample locus and assigning a cluster identifier to the file based at least in part on a result of the hashing operation;
    in response to a determination that the cluster identifier is not present in a data store, determining a set of candidate nearest neighbors for the cluster identifier;
    for each candidate nearest neighbor included in the set of candidate nearest neighbors, determining a set of existing cluster identifiers present in the data store;
    for each existing cluster identifier included in the set of existing cluster identifiers, determining a set of member loci;
    determining an edit distance between the sample locus and each locus included in the set of member loci; and
    in response to determining that at least a first locus included in the set of member loci is within a threshold edit distance of the sample locus, assigning one or more properties to the file based at least in part on properties associated with the first locus, wherein at least one property assigned to the file is an indicator of maliciousness.

18. The method of claim 17, further comprising transmitting a verdict that the file is malicious in response to associating an indicator of maliciousness with the file.

19. The method of claim 18 wherein the verdict is transmitted to a device from which the file was received.

20. The method of claim 17, further comprising transmitting an indication of at least one of the properties associated with the file to a device from which the file was received.

21. The method of claim 17 wherein associating the one or more properties to the file includes assigning one or more properties to the cluster identifier.

22. The method of claim 17 wherein at least one of the one or more properties comprises a label, and wherein the label is generated by selecting one or more words from a set of candidate words provided by a plurality of engines.

23. The method of claim 17 wherein the cluster identifier is assigned to the file based at least in part on a locality-sensitive hashing operation.

24. The method of claim 17 wherein down-sampling the transformed file includes performing a blur operation.

25. The method of claim 17 wherein down-sampling the transformed file includes performing an anti-aliasing operation.

26. The method of claim 17 wherein down-sampling the transformed file includes performing a resize operation.

27. A system, comprising:
an interface configured to receive a file;
a processor configured to:
transform file contents using a space-filling curve;
down-sample the transformed file contents to generate a sample locus;
assign a cluster identifier to the file based at least in part on the sample locus;
in response to a determination that the cluster identifier is not present in a data store, determine a set of candidate nearest neighbors for the cluster identifier;
for each candidate nearest neighbor included in the set of candidate nearest neighbors, determine a set of existing cluster identifiers present in the data store;
for each existing cluster identifier included in the set of existing cluster identifiers, determine a set of member loci;
determine an edit distance between the sample locus and each locus included in the set of member loci; and
in response to determining that at least a first locus included in the set of member loci is within a threshold edit distance of the sample locus, assign one or more properties to the file based at least in part on properties associated with the first locus, wherein at least one property assigned to the file is an indicator of maliciousness; and
a memory coupled to the processor and configured to provide the processor with instructions.

28. A method, comprising:

receiving a file;

transforming file contents using a space-filling curve;

down-sampling the transformed file contents to generate a sample locus;

assigning a cluster identifier to the file based at least in part on the sample locus;

in response to determining that the cluster identifier is not present in a data store, determining a set of candidate nearest neighbors for the cluster identifier;

for each candidate nearest neighbor included in the set of candidate nearest neighbors, determining a set of existing cluster identifiers present in the data store;

for each existing cluster identifier included in the set of existing cluster identifiers, determining a set of member loci;

determining an edit distance between the sample locus and each locus included in the set of member loci; and in response to determining that at least a first locus included in the set of member loci is within a threshold edit distance of the sample locus, assigning one or more properties to the file based at least in part on properties associated with the first locus, wherein at least one property assigned to the file is an indicator of maliciousness.

* * * * *

UNITED STATES PATENT AND TRADEMARK OFFICE
CERTIFICATE OF CORRECTION

PATENT NO. : 10,546,143 B1
APPLICATION NO. : 15/812915
DATED : January 28, 2020
INVENTOR(S) : Rick Holloman Wesson It is certified that error appears in the above-identified patent and that said Letters Patent is hereby corrected as shown below:

In the Specification

In Column 7, Line 26, delete "$4_n$" and insert --$4^n$--, therefor.

In Column 8, Line 27, delete "4'" and insert --$4^n$--, therefor.

In Column 15, Line 1, delete "idenfiers" and insert --identifiers--, therefor.

Signed and Sealed this
Twenty-fourth Day of November, 2020

Andrei Iancu
*Director of the United States Patent and Trademark Office*